(12) United States Patent
Baghdasaryan

(10) Patent No.: US 9,749,131 B2
(45) Date of Patent: Aug. 29, 2017

(54) SYSTEM AND METHOD FOR IMPLEMENTING A ONE-TIME-PASSWORD USING ASYMMETRIC CRYPTOGRAPHY

(71) Applicant: NOK NOK LABS, INC., Palo Alto, CA (US)

(72) Inventor: Davit Baghdasaryan, San Francisco, CA (US)

(73) Assignee: NOK NOK LABS, INC., Palo Alto, CA (US)

( * ) Notice: Subject to any disclaimer, the term of this patent is extended or adjusted under 35 U.S.C. 154(b) by 296 days.

(21) Appl. No.: 14/448,747

(22) Filed: Jul. 31, 2014

(65) Prior Publication Data

US 2017/0111170 A1 Apr. 20, 2017

(51) Int. Cl.

| | |
|---|---|
| *H04L 9/08* | (2006.01) |
| *H04W 4/00* | (2009.01) |
| *G06Q 20/38* | (2012.01) |
| *G06Q 20/40* | (2012.01) |
| *H04L 9/30* | (2006.01) |

(52) U.S. Cl.
CPC ....... *H04L 9/0866* (2013.01); *G06Q 20/3829* (2013.01); *G06Q 20/40145* (2013.01); *H04L 9/30* (2013.01); *H04W 4/008* (2013.01); *H04L 2209/24* (2013.01)

(58) Field of Classification Search
None
See application file for complete search history.

(56) References Cited

U.S. PATENT DOCUMENTS

| | | |
|---|---|---|
| 5,280,527 A | 1/1994 | Gullman et al. |
| 5,764,789 A | 6/1998 | Pare, Jr. et al. |

(Continued)

FOREIGN PATENT DOCUMENTS

| | | |
|---|---|---|
| WO | 2005003985 A1 | 1/2005 |
| WO | 2013082190 A1 | 6/2013 |

OTHER PUBLICATIONS

Notice of Allowance from U.S. Appl. No. 13/730,791 mailed Mar. 10, 2015, 17 pages.

(Continued)

*Primary Examiner* — Kaveh Abrishamkar
(74) *Attorney, Agent, or Firm* — Nicholson De Vos Webster & Elliott LLP

(57) ABSTRACT

A system, apparatus, method, and machine readable medium are described for authentication with asymmetric cryptography. For example, a method in accordance with one embodiment comprises: generating a challenge at a server; encrypting the challenge at the server using a public encryption key; transmitting the encrypted challenge to a connected device having a first connection over a network with the server; providing the encrypted challenge from the connected device to a user device; decrypting the encrypted challenge using a private encryption key corresponding to the public encryption key to determine the challenge; converting the challenge to a converted challenge, the converted challenge having a different format than the original challenge; receiving the converted challenge at the connected device and providing the converted challenge from the connected device to the server; and validating the converted challenge at the server to authenticate the user.

25 Claims, 11 Drawing Sheets

(56) References Cited

U.S. PATENT DOCUMENTS

| | | | |
|---|---|---|---|
| 6,088,450 A | 7/2000 | Davis et al. |
| 6,178,511 B1 | 1/2001 | Cohen et al. |
| 6,377,691 B1 | 4/2002 | Swift et al. |
| 6,618,806 B1 | 9/2003 | Brown et al. |
| 6,751,733 B1 | 6/2004 | Nakamura et al. |
| 6,842,896 B1 | 1/2005 | Redding et al. |
| 6,938,156 B2 | 8/2005 | Wheeler et al. |
| 7,155,035 B2 | 12/2006 | Kondo et al. |
| 7,194,763 B2 | 3/2007 | Potter et al. |
| 7,263,717 B1 | 8/2007 | Boydstun et al. |
| 7,444,368 B1 | 10/2008 | Wong et al. |
| 7,487,357 B2 | 2/2009 | Smith et al. |
| 7,512,567 B2 | 3/2009 | Bemmel et al. |
| 7,698,565 B1 | 4/2010 | Bjorn et al. |
| 7,865,937 B1 | 1/2011 | White et al. |
| 7,941,669 B2 | 5/2011 | Foley et al. |
| 8,060,922 B2 | 11/2011 | Crichton et al. |
| 8,166,531 B2 | 4/2012 | Suzuki |
| 8,245,030 B2 | 8/2012 | Lin |
| 8,284,043 B2 | 10/2012 | Judd et al. |
| 8,291,468 B1 | 10/2012 | Chickering |
| 8,353,016 B1 | 1/2013 | Pravetz et al. |
| 8,359,045 B1 | 1/2013 | Hopkins, III |
| 8,458,465 B1 | 6/2013 | Stern et al. |
| 8,489,506 B2 | 7/2013 | Hammad et al. |
| 8,516,552 B2 | 8/2013 | Raleigh |
| 8,555,340 B2 | 10/2013 | Potter et al. |
| 8,561,152 B2 | 10/2013 | Novak et al. |
| 8,584,224 B1 | 11/2013 | Pei et al. |
| 8,607,048 B2 | 12/2013 | Nogawa |
| 8,646,060 B1 | 2/2014 | Ben Ayed |
| 8,713,325 B2 | 4/2014 | Ganesan |
| 8,719,905 B2 | 5/2014 | Ganesan |
| 8,776,180 B2 | 7/2014 | Kumar et al. |
| 8,856,541 B1 | 10/2014 | Chaudhury et al. |
| 8,949,978 B1 | 2/2015 | Lin et al. |
| 8,958,599 B1 | 2/2015 | Starner |
| 8,978,117 B2 | 3/2015 | Bentley et al. |
| 9,015,482 B2 | 4/2015 | Baghdasaryan et al. |
| 9,032,485 B2 | 5/2015 | Chu et al. |
| 9,083,689 B2 | 7/2015 | Lindemann et al. |
| 9,171,306 B1 | 10/2015 | He et al. |
| 9,172,687 B2 | 10/2015 | Baghdasaryan et al. |
| 9,396,320 B2 | 7/2016 | Lindemann |
| 2002/0040344 A1 | 4/2002 | Preiser et al. |
| 2002/0073316 A1 | 6/2002 | Collins et al. |
| 2002/0073320 A1 | 6/2002 | Rinkevich et al. |
| 2002/0087894 A1 | 7/2002 | Foley et al. |
| 2002/0112170 A1 | 8/2002 | Foley et al. |
| 2002/0174344 A1 | 11/2002 | Ting |
| 2002/0174348 A1 | 11/2002 | Ting |
| 2003/0055792 A1 | 3/2003 | Kinoshita et al. |
| 2003/0065805 A1 | 4/2003 | Barnes et al. |
| 2003/0084300 A1 | 5/2003 | Koike |
| 2003/0087629 A1 | 5/2003 | Juitt et al. |
| 2003/0115142 A1 | 6/2003 | Brickell et al. |
| 2003/0135740 A1 | 7/2003 | Talmor et al. |
| 2003/0152252 A1 | 8/2003 | Kondo et al. |
| 2003/0226036 A1 | 12/2003 | Bivens et al. |
| 2003/0236991 A1 | 12/2003 | Letsinger |
| 2004/0101170 A1 | 5/2004 | Tisse et al. |
| 2004/0123153 A1 | 6/2004 | Wright et al. |
| 2005/0021964 A1 | 1/2005 | Bhatnagar et al. |
| 2005/0080716 A1 | 4/2005 | Belyi et al. |
| 2005/0097320 A1 | 5/2005 | Golan et al. |
| 2005/0125295 A1 | 6/2005 | Tidwell et al. |
| 2005/0160052 A1 | 7/2005 | Schneider et al. |
| 2005/0187883 A1* | 8/2005 | Bishop .................. G06Q 20/027 705/67 |
| 2005/0223236 A1 | 10/2005 | Yamada et al. |
| 2005/0278253 A1 | 12/2005 | Meek et al. |
| 2006/0026671 A1 | 2/2006 | Potter et al. |
| 2006/0029062 A1 | 2/2006 | Rao et al. |
| 2006/0156385 A1 | 7/2006 | Chiviendacz et al. |
| 2006/0282670 A1 | 12/2006 | Karchov |
| 2007/0005988 A1 | 1/2007 | Zhang et al. |
| 2007/0077915 A1 | 4/2007 | Black et al. |
| 2007/0088950 A1 | 4/2007 | Wheeler et al. |
| 2007/0100756 A1 | 5/2007 | Varma |
| 2007/0106895 A1 | 5/2007 | Huang et al. |
| 2007/0107048 A1 | 5/2007 | Halls et al. |
| 2007/0118883 A1 | 5/2007 | Potter et al. |
| 2007/0165625 A1 | 7/2007 | Eisner et al. |
| 2007/0168677 A1 | 7/2007 | Kudo et al. |
| 2007/0169182 A1 | 7/2007 | Wolfond et al. |
| 2007/0198435 A1 | 8/2007 | Siegal et al. |
| 2007/0239980 A1 | 10/2007 | Funayama |
| 2007/0278291 A1* | 12/2007 | Rans .................. G06Q 20/341 235/380 |
| 2007/0286130 A1 | 12/2007 | Shao et al. |
| 2008/0005562 A1 | 1/2008 | Sather et al. |
| 2008/0025234 A1 | 1/2008 | Zhu et al. |
| 2008/0034207 A1 | 2/2008 | Cam-Winget et al. |
| 2008/0046334 A1 | 2/2008 | Lee et al. |
| 2008/0046984 A1 | 2/2008 | Bohmer et al. |
| 2008/0049983 A1 | 2/2008 | Miller et al. |
| 2008/0086759 A1 | 4/2008 | Colson |
| 2008/0134311 A1 | 6/2008 | Medvinsky et al. |
| 2008/0141339 A1 | 6/2008 | Gomez et al. |
| 2008/0172725 A1 | 7/2008 | Fujii et al. |
| 2008/0209545 A1 | 8/2008 | Asano |
| 2008/0232565 A1 | 9/2008 | Kutt et al. |
| 2008/0235801 A1 | 9/2008 | Soderberg et al. |
| 2008/0271150 A1 | 10/2008 | Boerger et al. |
| 2008/0289019 A1 | 11/2008 | Lam |
| 2008/0313719 A1 | 12/2008 | Kaliski, Jr. et al. |
| 2008/0320308 A1 | 12/2008 | Kostiainen et al. |
| 2009/0049510 A1 | 2/2009 | Zhang et al. |
| 2009/0064292 A1 | 3/2009 | Carter et al. |
| 2009/0089870 A1 | 4/2009 | Wahl |
| 2009/0100269 A1 | 4/2009 | Naccache |
| 2009/0116651 A1 | 5/2009 | Liang et al. |
| 2009/0133113 A1 | 5/2009 | Schneider |
| 2009/0138724 A1 | 5/2009 | Chiou et al. |
| 2009/0138727 A1* | 5/2009 | Campello de Souza .................. G06F 21/80 713/193 |
| 2009/0158425 A1 | 6/2009 | Chan et al. |
| 2009/0183003 A1 | 7/2009 | Haverinen |
| 2009/0193508 A1 | 7/2009 | Brenneman et al. |
| 2009/0196418 A1 | 8/2009 | Tkacik et al. |
| 2009/0199264 A1 | 8/2009 | Lang |
| 2009/0204964 A1 | 8/2009 | Foley et al. |
| 2009/0235339 A1 | 9/2009 | Mennes et al. |
| 2009/0271618 A1 | 10/2009 | Camenisch et al. |
| 2009/0300714 A1 | 12/2009 | Ahn |
| 2009/0307139 A1 | 12/2009 | Mardikar et al. |
| 2009/0327131 A1 | 12/2009 | Beenau et al. |
| 2009/0328197 A1 | 12/2009 | Newell et al. |
| 2010/0010932 A1 | 1/2010 | Law et al. |
| 2010/0023454 A1 | 1/2010 | Exton et al. |
| 2010/0029300 A1 | 2/2010 | Chen |
| 2010/0042848 A1 | 2/2010 | Rosener |
| 2010/0062744 A1 | 3/2010 | Ibrahim |
| 2010/0070424 A1 | 3/2010 | Monk |
| 2010/0082484 A1 | 4/2010 | Erhart et al. |
| 2010/0083000 A1 | 4/2010 | Kesanupalli |
| 2010/0094681 A1 | 4/2010 | Almen et al. |
| 2010/0105427 A1 | 4/2010 | Gupta |
| 2010/0107222 A1 | 4/2010 | Glasser |
| 2010/0114776 A1 | 5/2010 | Weller et al. |
| 2010/0169650 A1 | 7/2010 | Brickell et al. |
| 2010/0175116 A1 | 7/2010 | Gum |
| 2010/0186072 A1 | 7/2010 | Kumar |
| 2010/0192209 A1 | 7/2010 | Steeves et al. |
| 2010/0223663 A1 | 9/2010 | Morimoto et al. |
| 2010/0242088 A1 | 9/2010 | Thomas |
| 2010/0287369 A1 | 11/2010 | Monden |
| 2010/0325664 A1 | 12/2010 | Kang |
| 2010/0325684 A1 | 12/2010 | Grebenik et al. |
| 2010/0325711 A1 | 12/2010 | Etchegoyen |
| 2011/0004933 A1 | 1/2011 | Dickinson et al. |
| 2011/0022835 A1 | 1/2011 | Schibuk |
| 2011/0047608 A1 | 2/2011 | Levenberg |

(56) References Cited

U.S. PATENT DOCUMENTS

| | | |
|---|---|---|
| 2011/0071841 A1 | 3/2011 | Fomenko et al. |
| 2011/0078443 A1 | 3/2011 | Greenstein et al. |
| 2011/0082801 A1 | 4/2011 | Baghdasaryan et al. |
| 2011/0083016 A1 | 4/2011 | Kesanupalli et al. |
| 2011/0107087 A1 | 5/2011 | Lee et al. |
| 2011/0167154 A1 | 7/2011 | Bush et al. |
| 2011/0167472 A1 | 7/2011 | Evans et al. |
| 2011/0191200 A1 | 8/2011 | Bayer et al. |
| 2011/0197267 A1 | 8/2011 | Gravel et al. |
| 2011/0219427 A1* | 9/2011 | Hito .................. G06F 21/00 726/3 |
| 2011/0225431 A1 | 9/2011 | Stufflebeam, Jr. et al. |
| 2011/0228330 A1 | 9/2011 | Nogawa |
| 2011/0231911 A1 | 9/2011 | White et al. |
| 2011/0246766 A1 | 10/2011 | Orsini et al. |
| 2011/0265159 A1 | 10/2011 | Ronda et al. |
| 2011/0279228 A1 | 11/2011 | Kumar et al. |
| 2011/0280402 A1 | 11/2011 | Ibrahim et al. |
| 2011/0296518 A1 | 12/2011 | Faynberg et al. |
| 2011/0307706 A1* | 12/2011 | Fielder .............. G06F 21/6209 713/181 |
| 2011/0307949 A1 | 12/2011 | Ronda et al. |
| 2011/0314549 A1 | 12/2011 | Song et al. |
| 2011/0320823 A1 | 12/2011 | Saroiu et al. |
| 2012/0018506 A1 | 1/2012 | Hammad et al. |
| 2012/0023568 A1 | 1/2012 | Cha et al. |
| 2012/0046012 A1 | 2/2012 | Forutanpour et al. |
| 2012/0075062 A1 | 3/2012 | Osman et al. |
| 2012/0084566 A1 | 4/2012 | Chin et al. |
| 2012/0102553 A1 | 4/2012 | Hsueh et al. |
| 2012/0124639 A1 | 5/2012 | Shaikh et al. |
| 2012/0124651 A1 | 5/2012 | Ganesan et al. |
| 2012/0144461 A1 | 6/2012 | Rathbun |
| 2012/0159577 A1 | 6/2012 | Belinkiy et al. |
| 2012/0191979 A1 | 7/2012 | Feldbau |
| 2012/0203906 A1 | 8/2012 | Jaudon et al. |
| 2012/0204032 A1 | 8/2012 | Wilkins et al. |
| 2012/0210135 A1 | 8/2012 | Panchapakesan et al. |
| 2012/0249298 A1 | 10/2012 | Sovio et al. |
| 2012/0272056 A1 | 10/2012 | Ganesan |
| 2012/0278873 A1 | 11/2012 | Calero et al. |
| 2012/0291114 A1 | 11/2012 | Poliashenko et al. |
| 2012/0313746 A1 | 12/2012 | Rahman et al. |
| 2012/0317297 A1 | 12/2012 | Bailey |
| 2013/0042327 A1 | 2/2013 | Chow |
| 2013/0046976 A1 | 2/2013 | Rosati et al. |
| 2013/0046991 A1 | 2/2013 | Lu et al. |
| 2013/0054967 A1 | 2/2013 | Davoust et al. |
| 2013/0061055 A1 | 3/2013 | Schibuk |
| 2013/0067546 A1 | 3/2013 | Thavasi et al. |
| 2013/0073859 A1 | 3/2013 | Carlson et al. |
| 2013/0086669 A1 | 4/2013 | Sondhi et al. |
| 2013/0090939 A1 | 4/2013 | Robinson et al. |
| 2013/0097682 A1 | 4/2013 | Zeljkovic et al. |
| 2013/0104187 A1 | 4/2013 | Weidner |
| 2013/0104190 A1 | 4/2013 | Simske et al. |
| 2013/0119130 A1 | 5/2013 | Braams |
| 2013/0124285 A1 | 5/2013 | Pravetz et al. |
| 2013/0125197 A1 | 5/2013 | Pravetz et al. |
| 2013/0125222 A1 | 5/2013 | Pravetz et al. |
| 2013/0133049 A1 | 5/2013 | Peirce |
| 2013/0133054 A1 | 5/2013 | Davis et al. |
| 2013/0144785 A1 | 6/2013 | Karpenko et al. |
| 2013/0159413 A1 | 6/2013 | Davis et al. |
| 2013/0159716 A1 | 6/2013 | Buck et al. |
| 2013/0160083 A1 | 6/2013 | Schrix et al. |
| 2013/0167196 A1 | 6/2013 | Spencer et al. |
| 2013/0219456 A1 | 8/2013 | Sharma et al. |
| 2013/0227646 A1 | 8/2013 | Haggerty et al. |
| 2013/0239173 A1 | 9/2013 | Dispensa |
| 2013/0318343 A1 | 11/2013 | Bjarnason et al. |
| 2013/0337777 A1 | 12/2013 | Deutsch et al. |
| 2013/0346176 A1 | 12/2013 | Alolabi et al. |
| 2014/0007215 A1 | 1/2014 | Romano et al. |
| 2014/0013422 A1 | 1/2014 | Janus et al. |
| 2014/0033271 A1 | 1/2014 | Barton et al. |
| 2014/0040987 A1 | 2/2014 | Haugsnes |
| 2014/0044265 A1 | 2/2014 | Kocher et al. |
| 2014/0047510 A1 | 2/2014 | Belton et al. |
| 2014/0066015 A1 | 3/2014 | Aissi |
| 2014/0068746 A1 | 3/2014 | Gonzalez Martinez et al. |
| 2014/0075516 A1 | 3/2014 | Chermside |
| 2014/0089243 A1 | 3/2014 | Oppenheimer |
| 2014/0096182 A1 | 4/2014 | Smith |
| 2014/0101439 A1 | 4/2014 | Pettigrew et al. |
| 2014/0109174 A1 | 4/2014 | Barton et al. |
| 2014/0115702 A1 | 4/2014 | Li et al. |
| 2014/0130127 A1 | 5/2014 | Toole et al. |
| 2014/0137191 A1 | 5/2014 | Goldsmith et al. |
| 2014/0164776 A1 | 6/2014 | Hook et al. |
| 2014/0173754 A1 | 6/2014 | Barbir |
| 2014/0188770 A1 | 7/2014 | Agrafioti et al. |
| 2014/0189350 A1 | 7/2014 | Baghdasaryan et al. |
| 2014/0189360 A1 | 7/2014 | Baghdasaryan et al. |
| 2014/0189779 A1 | 7/2014 | Baghdasaryan et al. |
| 2014/0189791 A1* | 7/2014 | Lindemann .......... H04L 63/105 726/3 |
| 2014/0189807 A1 | 7/2014 | Cahill et al. |
| 2014/0189808 A1 | 7/2014 | Mahaffey et al. |
| 2014/0189828 A1 | 7/2014 | Baghdasaryan et al. |
| 2014/0189835 A1 | 7/2014 | Umerley |
| 2014/0201809 A1 | 7/2014 | Choyi et al. |
| 2014/0230032 A1 | 8/2014 | Duncan |
| 2014/0245391 A1 | 8/2014 | Adenuga |
| 2014/0250523 A1 | 9/2014 | Savvides et al. |
| 2014/0258125 A1 | 9/2014 | Gerber et al. |
| 2014/0258711 A1 | 9/2014 | Brannon |
| 2014/0282868 A1 | 9/2014 | Sheller et al. |
| 2014/0282945 A1 | 9/2014 | Smith et al. |
| 2014/0282965 A1 | 9/2014 | Sambamurthy et al. |
| 2014/0289117 A1 | 9/2014 | Baghdasaryan |
| 2014/0289820 A1 | 9/2014 | Lindemann et al. |
| 2014/0289833 A1 | 9/2014 | Briceno et al. |
| 2014/0298419 A1 | 10/2014 | Boubez et al. |
| 2015/0046340 A1 | 2/2015 | Dimmick |
| 2015/0142628 A1 | 5/2015 | Suplee et al. |
| 2015/0180869 A1 | 6/2015 | Verma |
| 2015/0269050 A1 | 9/2015 | Filimonov et al. |
| 2015/0326529 A1 | 11/2015 | Morita |
| 2015/0381580 A1 | 12/2015 | Graham, III et al. |
| 2016/0072787 A1* | 3/2016 | Balabine .............. H04L 63/12 726/6 |
| 2016/0087952 A1 | 3/2016 | Tartz et al. |
| 2016/0087957 A1 | 3/2016 | Shah et al. |
| 2017/0004487 A1 | 1/2017 | Hagen et al. |

OTHER PUBLICATIONS

Notice of Allowance from U.S. Appl. No. 13/730,795 mailed Jan. 14, 2016, 11 pages.
Notice of Allowance from U.S. Appl. No. 13/730,795 mailed May 15, 2015, 8 pages.
Notice of Allowance from U.S. Appl. No. 13/730,795 mailed Sep. 17, 2015, 11 pages.
Notice of Allowance from U.S. Appl. No. 14/066,384 mailed Sep. 27, 2016, 19 pages.
Notice of Allowance from U.S. Appl. No. 14/145,439 mailed Jul. 6, 2015, 6 pages.
Notice of Allowance from U.S. Appl. No. 14/145,439 mailed Mar. 14, 2016, 17 pages.
Notice of Allowance from U.S. Appl. No. 14/145,439 mailed Oct. 28, 2015, 12 pages.
Notice of Allowance from U.S. Appl. No. 14/145,533 mailed Jan. 20, 2016, 12 pages.
Notice of Allowance from U.S. Appl. No. 14/145,533 mailed May 11, 2015, 5 pages.
Notice of Allowance from U.S. Appl. No. 14/145,533 mailed Sep. 14, 2015, 13 pages.
Notice of Allowance from U.S. Appl. No. 14/145,607 mailed Feb. 1, 2016, 28 pages.
Notice of Allowance from U.S. Appl. No. 14/145,607 mailed Sep. 2, 2015, 19 pages.

(56) References Cited

OTHER PUBLICATIONS

Notice of Allowance from U.S. Appl. No. 14/268,619 mailed Oct. 3, 2016, 65 pages.
Notice of Allowance from U.S. Appl. No. 14/268,619 mailed Jul. 19, 2016, 5 pages.
Notice of Allowance from U.S. Appl. No. 14/268,686 mailed Apr. 18, 2016, 16 pages.
Notice of Allowance from U.S. Appl. No. 14/268,686 mailed Jul. 8, 2016, 4 pages.
Notice of Allowance from U.S. Appl. No. 14/268,686 mailed Mar. 30, 2016, 38 pages.
Notice of Allowance from U.S. Appl. No. 14/268,686 mailed Nov. 5, 2015, 23 pages.
Notice of Allowance from U.S. Appl. No. 14/268,733 mailed Sep. 23, 2016, 8 pages.
Notice of Allowance from U.S. Appl. No. 14/448,641 mailed Jun. 7, 2016, 13 pages.
Notice of Allowance from U.S. Appl. No. 14/448,697 mailed Jan. 14, 2016, 23 pages.
Notice of Allowance from U.S. Appl. No. 14/448,697 mailed May 20, 2016, 14 pages.
Notice of Allowance from U.S. Appl. No. 14/448,697 mailed Sep. 1, 2016, 3 pages.
Notice of Allowance from U.S. Appl. No. 14/448,697 mailed Sep. 15, 2015, 14 pages.
Notice of Allowance from U.S. Appl. No. 14/487,992 mailed Sep. 6, 2016, 26 pages.
Notification Concerning Transmittal of International Preliminary Report on Patentability for Application No. PCT/US14/39627, mailed on Dec. 10, 2015, 8 pages.
Notification of Transmittal of the International Search Report and the Written Opinion from counterpart Patent Cooperation Treaty Application No. PCT/US13/77888, mailed Aug. 4, 2014, 10 pages.
Notification of Transmittal of the International Search Report and the Written Opinion from counterpart Patent Cooperation Treaty Application No. PCT/US14/31344, mailed Nov. 3, 2014, 16 pages.
Notification of Transmittal of the International Search Report and the Written Opinion from counterpart Patent Cooperation Treaty Application No. PCT/US14/39627, mailed Oct. 16, 2014, 10 pages.
Notification of Transmittal of the International Search Report and the Written Opinion from counterpart Patent Cooperation Treaty Application No. PCT/US15/50348, mailed Dec. 22, 2015, 9 pages.
Notification of Transmittal of the International Search Report and the Written Opinion from counterpart Patent Cooperation Treaty Application No. PCT/US2015/042786, mailed Oct. 16, 2015, 8 pages.
Notification of Transmittal of the International Search Report and the Written Opinion from counterpart Patent Cooperation Treaty Application No. PCT/US2015/042799, mailed Oct. 16, 2015, 8 pages.
Notification of Transmittal of the International Search Report and the Written Opinion from counterpart Patent Cooperation Treaty Application No. PCT/US2015/042870, mailed Oct. 30, 2015, 9 pages.
Notification of Transmittal of the International Search Report and the Written Opinion from counterpart Patent Cooperation Treaty Application No. PCT/US2015/42783, mailed Oct. 19, 2015, 13 pages.
Notification of Transmittal of the International Search Report and the Written Opinion from counterpart Patent Cooperation Treaty Application No. PCT/US2015/42827, mailed Oct. 30, 2015, 9 pages.
Notification of Transmittal or International Search Report and Written Opinion from PCT/US2015/028927, mailed Jul. 30, 2015, 12 pages.
Pan G., et al., "Liveness Detection for Face Recognition" in: Recent Advances in Face Recognition, 2008, pp. 109-124, Vienna : I-Tech, 2008, Ch. 9, ISBN: 978-953-7619-34-3.
Pan G., et al., "Monocular Camera-based Face Liveness Detection by Combining Eyeblink and Scene Context," pp. 215-225, s.l. : Springer Science+Business Media, LLC, Aug. 4, 2010. Retrieved from the Internet: URL: http://www.cs.zju.edu.cn/-gpan/publication/2011-TeleSysliveness.pdf.
Peng Y., et al., "RASL: Robust Alignment by Sparse and Low-Rank Decomposition for Linearly Correlated Images", IEEE Conference on Computer Vision and Pattern Recognition, 2010, pp. 763-770. Retrieved from the Internet: URL: http://yima.csl.illinois.edu/psfile/RASL CVPR10.pdf.
Phillips P. J., et al., "Biometric Image Processing and Recognition," Chellappa, 1998, Eusipco, 8 pages.
Phillips P.J., et al., "Face Recognition Vendor Test 2002: Evaluation Report," s.l. : NISTIR 6965, 2002, 56 pages. Retrieved from the Internet: URL: http://www.facerec.org/vendors/FRVT2002_Evaluation_Report.pdf.
Phillips P.J., et al., "FRVT 2006 and ICE 2006 Large-Scale Results", NIST IR 7408, Gaithersburg, NIST, 2006, Mar. 29, 2007, pp. 1-55.
Pinto A., et al., "Video-Based Face Spoofing Detection through Visual Rhythm Analysis," Los Alamitos : IEEE computer Society Conference Publishing Services, 2012, Conference on Graphics, Patterns and Images, 8 pages. (SIBGRAPI). Retrieved from the Internet: URL: http://sibgrapi.sid.inpe.br/rep/sid.inpe.br/sibgrapi/2012/07.13.21.16?mirror=sid.inpe.br/ banon/2001/03.30.15.38.24&metadatarepository=sid.inpe.br/sibgrapi/2012/07.13.21.1 6.53.
Quinn G.W., et al., "Performance of Face Recognition Algorithms on Compressed Images", NIST Inter Agency Report 7830, NIST, Dec. 4, 2011, 35 pages.
Ratha N.K., et al., "An Analysis of Minutiae Matching Strength," Audio-and Video-Based Biometric Person Authentication, Springer Berlin Heidelberg, 2001, 7 pages.
Ratha N.K., et al., "Enhancing Security and Privacy in Biometrics-Based Authentication Systems," IBM Systems Journal, 2001, vol. 40 (3), pp. 614-634.
Requirement for Restriction/Election from U.S. Appl. No. 14/218,504 mailed Aug. 16, 2016, 11 pages.
Roberts C., "Biometric Attack Vectors and Defences," Sep. 2006, 25 pages. Retrieved from the Internet: URL: http://otago.ourarchive.ac.nz/bitstream/handle/10523/1243/BiometricAttackVectors.pdf.
Rocha A., et al., "Vision of the Unseen: Current Trends and Challenges in Digital Image and Video Forensics," ACM Computing Surveys, 2010, 47 pages. Retrieved from the Internet: URL: http://www.wjscheirer.com/papers/wjscsur2011forensics.pdf.
Rodrigues R.N., et al., "Robustness of Multimodal Biometric Fusion Methods Against Spoof Attacks," Journal of Visual Language and Computing. 2009. 11 pages, doi:10.1016/j.jvlc.2009.01.010; Retrieved from the Internet: URL: http://cubs.buffalo.edu/govind/papers/visual09.pdf.
Ross A., et al., "Multimodal Biometrics: An Overview," Proceedings of 12th European Signal Processing Conference (EUSIPCO), Sep. 2004, pp. 1221-1224. Retrieved from the Internet: URL: http://www.csee.wvu.edu/-ross/pubs/RossMultimodaiOverview EUSIPC004.pdf.
Schneier B., Biometrics: Uses and Abuses. Aug. 1999. Inside Risks 110 (CACM 42, Aug. 8, 1999), Retrieved from the Internet: URL: http://www.schneier.com/essay-019.pdf, 3 pages.
Schuckers, "Spoofing and Anti-Spoofing Measures," Information Security Technical Report, 2002, vol. 2002, pp. 56-62.
Schwartz., et al., "Face Spoofing Detection Through Partial Least Squares and Low-Level Descriptors," International Conference on Biometrics, 2011, vol. 2011, pp. 1-8.
Smiatacz M., et al., Gdansk University of Technology. Liveness Measurements Using Optical Flow for Biometric Person Authentication. Metrology and Measurement Systems. 2012, vol. XIX, 2. pp. 257-268.
Supplementary Partial European Search Report for Application No. 13867269, mailed Aug. 3, 2016, 7 pages.
T. Weigold et al., "The Zurich Trusted Information Channel—An Efficient Defence against Man-in-the-Middle and Malicious Software Attacks," P. Lipp, A.R. Sadeghi, and K.M. Koch, eds., Proc. Trust Conf. (Trust 2008), LNCS 4968, Springer-Verlag, 2008, pp. 75-91.
Tan., et al., "Face Liveness Detection from a Single Image with Sparse Low Rank Bilinear Discriminative Model," European Conference on Computer Vision, 2010, vol. 2010, pp. 1-14.

(56) References Cited

OTHER PUBLICATIONS

The Extended M2VTS Database, [retrieved on Sep. 29, 2012], Retrieved from the Internet: URL: http://www.ee.surrey.ac.uk/CVSSP/xm2vtsdb/, 1 page.
The Online Certificate Status Protocol, OCSP, RFC2560, 22 pages.
The source for Linux information, Linux.com, [online], [retrieved on Jan. 28, 2015], 2012, 3 pages.
Transmittal of International Preliminary Report on Patentability for Patent Application No. PCT/US2013/077888 mailed on Jul. 9, 2015, 7 pages.
Transmittal of International Preliminary Report on Patentability from foreign counterpart PCT Patent Application No. PCT/US2014/031344 mailed Oct. 1, 2015, 9 pages.
Tresadern P., et al., "Mobile Biometrics (MoBio): Joint Face and Voice Verification for a Mobile Platform", 2012, 7 pages. Retrieved from the Internet: URL: http://personal.ee.surrey.ac.uk/Personai/Norman.Poh/data/tresadern_PervComp2012draft.pdf.
Tronci R., et al., "Fusion of Multiple Clues for Photo-Attack Detection in Face Recognition Systems," Inti. Joint Conference on Biometrics, 2011. pp. 1-6.
Uludag, Umut, and Anil K. Jain. "Attacks on biometric systems: a case study in fingerprints." Electronic Imaging 2004. International Society for Optics and Photonics, 2004, 12 pages.
Unobtrusive User-Authentication on Mobile Phones using Biometric Gait Recognition, 2010, 6 pages.
Validity, OSTP Framework, 24 pages, 2010.
Vassilev, A.T.; du Castel, B.; Ali, A.M., "Personal Brokerage of Web Service Access," Security & Privacy, IEEE , vol. 5, No. 5, pp. 24-31, Sep.-Oct. 2007.
WikiPedia article for Eye Tracking, 15 pages, Last Modified Jun. 21, 2014, en.wikipedia.org/wiki/Eye_tracking.
Willis N., Linux.com. Weekend Project: Take a Tour of Open Source Eye-Tracking Software. [Online] Mar. 2, 2012. [Cited: Nov. 1, 2012.], 4 pages. Retrieved from the Internet: URL: https://www.linux.com/learn/tutorials/550880-weekend-project-take-a-tour-of-opensource-eye-tracking-software.
Wilson, R., James. Unbuntu Life, "How to Trick Google's New Face Unlock on Android 4.1 Jelly Bean". Print Screen Mac. [Online] Aug. 6, 2012. [Cited: Sep. 28, 2012], 5 pages. http://printscreenmac.info/how-to-trick-android-jelly-bean-faceunlock/. downloaded Aug. 13, 2015.
World Wide Web Consortium, W3C Working Draft: Media Capture and Streams, 2013, 36 pages.
Zhang, "Security Verification of Hardware-enabled Attestation Protocols," IEEE, 2012, pp. 47-54.
Zhao W., et al., "Face Recognition: A Literature Survey," ACM Computing Surveys, 2003, vol. 35 (4), pp. 399-458.
Zhou, et al., "Face Recognition from Still Images and Videos". University of Maryland, College Park, MD 20742. Maryland : s.n., Nov. 5, 2004.pp. 1-23, Retrieved from the Internet: http://citeseerx.ist.psu.edu/viewdoc/download?doi=1 0.1.1.77.1312&rep=rep1&type=pdf.
Li J., et al., "Live Face Detection Based on the Analysis of Fourier Spectra," Biometric Technology for Human Identification, 2004, pp. 296-303.
Lubin, G., et al., "16 Heatmaps That Reveal Exactly Where People Look," Business Insider, [online], May 21, 2012, [Cited: Nov. 1, 2012], Retrieved from the Internet: URL: http://www.businessinsider.com/eye-tracking-heatmaps-2012-5?op=1, pp. 1-21.
Maatta J., et al., "Face Spoofing Detection From Single Images Using Micro-Texture Analysis," Machine Vision Group, University of Oulu, Finland, Oulu, IEEE, [online], 2011, Retrieved from the Internet: URL: http://www.ee.oulu.fi/research/mvmp/mvg/files/pdf/131.pdf., pp. 1-7.
Marcialis G.L., et al. "First International Fingerprint Liveness Detection Competition—Livdet 2009," Image Analysis and Processing—ICIAP, Springer Berlin Heidelberg, 2009. pp. 12-23.
Mobile Device Security Using Transient Authentication, IEEE Transactions on Mobile Computing, 2006, vol. 5 (11), pp. 1489-1502.
National Science & Technology Council's Subcommittee on Biometrics. Biometrics Glossary. 33 pages, Last updated Sep. 14, 2006. NSTC. http://www.biometrics.gov/documents/glossary.pdf.
Nielsen, Jakib. useit.com. Jakob Nielsen's Alertbox—Horizontal Attention Leans Left. [Online] Apr. 6, 2010. [Cited: Nov. 1, 2012.] 4 pages. http://www.useit.com/alertbox/horizontal-attention.html.
Nielsen, Jakob. useit.com. Jakob Nielsen's Alertbox—Scrolling and Attention. [Online] Mar. 22, 2010. [Cited: Nov. 1, 2012.] 6 pages. http://www.useit.com/alertbox/scrolling-attention.html.
Non-Final Office Action from U.S. Appl. No. 13/730,761 mailed Feb. 27, 2014, 24 pages.
Non-Final Office Action from U.S. Appl. No. 13/730,761 mailed Sep. 9, 2014, 36 pages.
Non-Final Office Action from U.S. Appl. No. 13/730,776 mailed Jul. 15, 2014, 16 pages.
Non-Final Office Action from U.S. Appl. No. 13/730,780 mailed Aug. 4, 2014, 30 pages.
Non-Final Office Action from U.S. Appl. No. 13/730,780 mailed Mar. 12, 2014, 22 pages.
Non-Final Office Action from U.S. Appl. No. 13/730,791 mailed Jun. 27, 2014, 17 pages.
Non-Final Office Action from U.S. Appl. No. 13/730,795 mailed Jan. 5, 2015, 19 pages.
Non-Final Office Action from U.S. Appl. No. 13/730,795 mailed Jun. 11, 2014, 14 pages.
Non-Final Office Action from U.S. Appl. No. 14/066,273 mailed Jun. 16, 2016, 43 pages.
Non-Final Office Action from U.S. Appl. No. 14/066,273 mailed May 8, 2015, 31 pages.
Non-Final Office Action from U.S. Appl. No. 14/066,384 mailed Jan. 7, 2015, 24 pages.
Non-Final Office Action from U.S. Appl. No. 14/066,384 mailed Mar. 17, 2016, 40 pages.
Non-Final Office Action from U.S. Appl. No. 14/145,439 mailed Feb. 12, 2015, 18 pages.
Non-Final Office Action from U.S. Appl. No. 14/145,466 mailed Sep. 9, 2016, 13 pages.
Non-Final Office Action from U.S. Appl. No. 14/145,533 mailed Jan. 26, 2015, 13 pages.
Non-Final Office Action from U.S. Appl. No. 14/145,607 mailed Mar. 20, 2015, 22 pages.
Non-Final Office Action from U.S. Appl. No. 14/218,551 mailed Apr. 23, 2015, 9 pages.
Non-Final Office Action from U.S. Appl. No. 14/218,551 mailed Jan. 21, 2016, 11 pages.
Non-Final Office Action from U.S. Appl. No. 14/218,551 mailed May 12, 2016, 11 pages.
Non-Final Office Action from U.S. Appl. No. 14/218,575 mailed Feb. 10, 2015, 17 pages.
Non-Final Office Action from U.S. Appl. No. 14/218,575 mailed Jan. 29, 2016, 25 pages.
Non-Final Office Action from U.S. Appl. No. 14/218,611 mailed Jun. 16, 2016, 13 pages.
Non-Final Office Action from U.S. Appl. No. 14/218,646 mailed Mar. 10, 2016, 23 pages.
Non-Final Office Action from U.S. Appl. No. 14/218,677 mailed Aug. 2, 2016, 15 pages.
Non-Final Office Action from U.S. Appl. No. 14/218,692 mailed Nov. 4, 2015, 16 pages.
Non-Final Office Action from U.S. Appl. No. 14/218,692 mailed Oct. 25, 2016, 33 pages.
Non-Final Office Action from U.S. Appl. No. 14/218,743 mailed Aug. 19, 2016, 11 pages.
Non-Final Office Action from U.S. Appl. No. 14/218,743 mailed Jan. 21, 2016, 12 pages.
Non-Final Office Action from U.S. Appl. No. 14/268,619 mailed Aug. 24, 2015, 17 pages.
Non-Final Office Action from U.S. Appl. No. 14/268,619 mailed Mar. 21, 2016, 7 pages.

(56) References Cited

OTHER PUBLICATIONS

Non-Final Office Action from U.S. Appl. No. 14/268,733 mailed Jul. 16, 2015, 13 pages.
Non-Final Office Action from U.S. Appl. No. 14/448,641 mailed Nov. 9, 2015, 21 pages.
Non-Final Office Action from U.S. Appl. No. 14/448,814 mailed Aug. 4, 2015, 13 pages.
Non-Final Office Action from U.S. Appl. No. 14/448,868 mailed Dec. 31, 2015, 12 pages.
Non-Final Office Action from U.S. Appl. No. 14/487,992 mailed Dec. 3, 2015, 15 pages.
Non-Final Office Action from U.S. Appl. No. 14/859,328 mailed Sep. 15, 2016, 39 pages.
Notice of Allowance from U.S. Appl. No. 14/487,992 mailed May 12, 2016, 11 pages.
Notice of Allowance from U.S. Appl. No. 13/730,761 mailed Jun. 10, 2015, 15 pages.
Notice of Allowance from U.S. Appl. No. 13/730,761 mailed Sep. 28, 2015, 5 pages.
Notice of Allowance from U.S. Appl. No. 13/730,776 mailed Feb. 13, 2015, 16 pages.
Notice of Allowance from U.S. Appl. No. 13/730,776 mailed Mar. 24, 2015, 3 pages.
Notice of Allowance from U.S. Appl. No. 13/730,780 mailed Aug. 13, 2015, 13 pages.
Abate A., et al.,"2D and 3D face recognition: A survey", 2007, pp. 1885-1906.
Advisory Action from U.S. Appl. No. 13/730,791 mailed Jan. 23, 2015, 4 pages.
Akhtar Z., et al.,"Spoof Attacks on Multimodal Biometric Systems", International Conference on Information and Network Technology, 2011, vol. 4, pp. 46-51.
Bao, W., et al.,"A liveness detection method for face recognition based on optical flow field", 2009, pp. 233-236, http://ieeexplore.ieee.org/stamp/stamp.jsp?tp=&arnumber=5054589&isnumber=5054562.
Barker E., et al.,"Recommendation for key management Part 3: Application-Specific Key Management Guidance", NIST Special Publication 800-57, 2009, pp. 1-103.
BehavioSec, "Measuring FAR/FRR/EER in Continuous Authentication," Stockholm, Sweden (2009), 8 pages.
Brickell, E., et al., Intel Corporation; Jan Camenish, IBM Research; Liqun Chen, HP Laboratories. "Direct Anonymous Attestation". Feb. 11, 2004, pp. 1-28 [online]. Retrieved from the Internet: URL:https://eprint.iacr.org/2004/205.pdf.
Chakka M., et al., "Competition on Counter Measures to 2-D Facial Spoofing Attacks". 6 pages .2011. http://www.csis.pace.edu/~ctappert/dps/IJCB2011/papers/130.pdf. 978-1-4577-1359- 0/11.
Chen L., et al., "Flexible and scalable digital signatures in TPM 2.0." Proceedings of the 2013 ACM SIGSAC conference on Computer & communications security. ACM, 2013, 12 pages.
Chetty G. School of ISE University of Canberra Australia. "Multilevel liveness verification for face-voice biometric authentication". BYSM-2006 Symposium. Baltimore: BYSM-Symposium 9 pages. Sep. 19, 2006. http://www.biometrics.org/bc2006/presentations/Tues_Sep_19/BSYM/19_Chetty_research.pdf.
Continuous User Authentication Using Temporal Information, http://www.cse.msu.edu/biometrics/Publications/Face/NiinumaJain_ContinuousAuth_SPIE10.pdf, 11 pages.
Crazy Egg Heatmap Shows Where People Click on Your Website, 2012, 3 pages, www.michaelhartzell.com/Blog/bid/92970/Crazy-Egg-Heatmap-shows-where-people-click-on-your-website).
Dawei Zhang; Peng Hu, "Trusted e-commerce user agent based on USB Key", Proceedings of the International MultiConference of Engineers and Computer Scientists 2008 vol. I, IMECS 2008, Mar. 19-21, 2008, Hong Kong, 7 pages.
Delac K. et al., Eds., InTech, Jun. 1, 2008, Retrieved from the Internet:, ISBN 978-953-7619-34-3, Uploaded as Individual Chapters 1-15, 15 pages.

Doherty, et al., Internet Engineering Task Force (IETF), "Dynamic Symmetric Key Provisioning Protocol (DSKPP)", Dec. 2010, 105 pages.
Edited by Kresimir Delac, Mislay Grgic and Marian Stewart Bartlett. s.l. : InTech Jun. 1, 2008. http://cdn.intechopen.com/finals/81/InTech- Recent_advances_in_face_recognition.zip. ISBN 978-953-7619-34-3. Uploaded as Chapters 1-15.
Extended European Search Report for Application No. 13867269, mailed Nov. 4, 2016, 10 pages.
Final Office Action from U.S. Appl. No. 13/730,761 mailed Jan. 15, 2015, 31 pages.
Final Office Action from U.S. Appl. No. 13/730,761 mailed Jul. 8, 2014, 36 pages.
Final Office Action from U.S. Appl. No. 13/730,776 mailed Nov. 3, 2014, 20 pages.
Final Office Action from U.S. Appl. No. 13/730,780 mailed Jan. 27, 2015, 30 pages.
Final Office Action from U.S. Appl. No. 13/730,780 mailed May 12, 2014, 34 pages.
Final Office Action from U.S. Appl. No. 13/730,791 mailed Nov. 13, 2014, 22 pages.
Final Office Action from U.S. Appl. No. 13/730,795 mailed Aug. 14, 2014, 20 pages.
Final Office Action from U.S. Appl. No. 14/066,273 mailed Feb. 11, 2016, 29 pages.
Final Office Action from U.S. Appl. No. 14/066,384 mailed Aug. 20, 2015, 23 pages.
Final Office Action from U.S. Appl. No. 14/218,551 mailed Sep. 9, 2015, 15 pages.
Final Office Action from U.S. Appl. No. 14/218,551 mailed Sep. 16, 2016, 11 pages.
Final Office Action from U.S. Appl. No. 14/218,575 mailed Aug. 7, 2015, 19 pages.
Final Office Action from U.S. Appl. No. 14/218,575 mailed Jul. 7, 2016, 29 pages.
Final Office Action from U.S. Appl. No. 14/218,646 mailed Aug. 11, 2016, 25 pages.
Final Office Action from U.S. Appl. No. 14/218,692 mailed Mar. 2, 2016, 24 pages.
Final Office Action from U.S. Appl. No. 14/268,619 mailed Dec. 14, 2015, 10 pages.
Final Office Action from U.S. Appl. No. 14/268,733 mailed Jan. 15, 2016, 14 pages.
Final Office Action from U.S. Appl. No. 14/448,814 mailed Feb. 16, 2016, 14 pages.
Final Office Action from U.S. Appl. No. 14/448,814 mailed Jun. 14, 2016, 17 pages.
Final Office Action from U.S. Appl. No. 14/448,868 mailed Aug. 19, 2016, 11 pages.
Grother, P.J., et al., NIST. Report on the Evaluation of 2D Still-Image Face Recognition Algorithms, NIST IR 7709. s.l, NIST, 2011, Jun. 22, 2010, pp. 1-58.
GSM Arena. [Online] Nov. 13, 2011, [Cited: Sep. 29, 2012], 2 pages, [retrieved on Aug. 18, 2015]. Retrieved from the Internet: URL: http://www.gsmarena.com/ice_cream_sandwichs_face_unlock_duped_using_a_photograph-news-3377.php.
Heikkila, M., et al., "A Texture-Based Method for Modeling the Background and Detecting Moving Objects". Oulu : IEEE [online]. Jun. 22, 2005. Draft. 16 pages Retrieved from the Internet: URL:http://www.ee.oulu.fi/mvg/files/pdf/pdf_662.pdf.
Hernandez, T., "But What Does It All Mean? Understanding Eye-Tracking Results (Part 3)", Sep. 4, 2007, 2 pages. EyeTools. Part III: What is a heatmap . . . really? [Online] [Cited: Nov. 1, 2012.] Retrieved from the Internet: URL:http://eyetools.com/articles/p3-understanding-eye-tracking-what-is-a-heatmap-really.
Himanshu, et al., "A Review of Face Recognition". International Journal of Research in Engineering & Applied Sciences. Feb. 2012, vol. 2, pp. 835-846. Retrieved from the Internet: URL:http://euroasiapub.org/IJREAS/Feb2012/81.pdf.
Huang L., et al., "Clickjacking: Attacks and Defenses". S.l. : Usenix Security 2012, pp. 1-16, 2012 [online]. Retrieved from the Internet: URL:https://www.usenix.org/system/files/conference/usenixsecurity12/sec12-final39.pdf.

(56) References Cited

OTHER PUBLICATIONS

International Preliminary Report on Patentability for Application No. PCT/US2015/028924 mailed Nov. 17, 2016, 9 pages.
International Preliminary Report on Patentability for Application No. PCT/US2015/028927 mailed Nov. 17, 2016, 10 pages.
International Search Report and Written Opinion for Application No. PCT/US2015/028924 mailed Jul. 30, 2015, 10 pages.
Jafri R., et al. "A Survey of Face Recognition Techniques," Journal of Information Processing Systems, 2009, vol. 5 (2), pp. 41-68.
Kollreider K., et al., "Evaluating Liveness by Face Images and the Structure Tensor," Halmstad, Sweden: s.n., Halmstad University, SE-30118, Sweden, [online], 2005, Retrieved from the Internet: URL:http://citeseerx.ist.psu.edu/viewdoc/download?doi=10.1.1.62.6534&rep=rep1&type=pdf, pp. 75-80.
Kollreider K., et al., "Non-Instrusive Liveness Detection by Face Images," Image and Vision Computing, 2007, vol. 27 (3), pp. 233-244.
Kong S., et al. "Recent Advances in Visual and Infrared Face Recognition: A Review," Journal of Computer Vision and Image Understanding, 2005, vol. 97 (1), pp. 103-135.
Communication pursuant to Rules 161(2) and 162 EPC for EP Application No. 15826364.0, mailed Mar. 7, 2017, 2 pages.
Extended European Search Report for Application No. 14803988.6, mailed Dec. 23, 2016, 10 pages.
Extended European Search Report from European Patent Application No. 14770682.4, mailed Jan. 17, 2017, 14 pages.
Final Office Action from U.S. Appl. No. 14/066,273, mailed Jan. 10, 2017, 24 pages.
Final Office Action from U.S. Appl. No. 14/145,466, mailed Apr. 13, 2017, 61 pages.
Final Office Action from U.S. Appl. No. 14/218,611, mailed Jan. 27, 2017, 14 pages.
Final Office Action from U.S. Appl. No. 14/218,692, mailed Feb. 28, 2017, 27 pages.
Final Office Action from U.S. Appl. No. 14/218,743, mailed Mar. 3, 2017, 67 pages.
Final Office Action from U.S. Appl. No. 14/859,328, mailed Mar. 6, 2017, 26 pages.
Julian J., et al., "Biometric Enabled Portable Trusted Computing Platform," Trust Security and Privacy in Computing and Communications (TRUSTCOM), 2011 IEEE 10th International Conference on Nov. 16, 2011, pp. 436-442, XP032086831, DOI:10.1109/TRUSTCOM.2011.56, ISBN: 978-1-4577-2135-9.
Kim et al., "Secure User Authentication based on the Trusted Platform for Mobile Devices," EURASIP Journal on Wireless Communications and Networking, pp. 1-15.
Non-Final Office Action from U.S. Appl. No. 14/066,273 mailed May 18, 2017, 46 pages.
Non-Final Office Action from U.S. Appl. No. 14/218,504, mailed Feb. 27, 2017, 12 pages.
Non-Final Office Action from U.S. Appl. No. 14/218,575, mailed May 4, 2017, 88 pages.
Non-Final Office Action from U.S. Appl. No. 14/218,646, mailed Mar. 27, 2017, 24 pages.
Non-Final Office Action from U.S. Appl. No. 14/218,677, mailed Feb. 10, 2017, 18 pages.
Non-final Office Action from U.S. Appl. No. 14/268,563, mailed Apr. 21, 2017, 83 pages.
Non-Final Office Action from U.S. Appl. No. 14/448,814, mailed Apr. 5, 2017, 57 pages.
Notice of Allowance from U.S. Appl. No. 14/218,551, mailed Feb. 8, 2017, 8 pages.
Notice of Allowance from U.S. Appl. No. 14/066,384, mailed May 23, 2017, 50 pages.
Notice of Allowance from U.S. Appl. No. 14/218,551, mailed Feb. 8, 2017, 56 pages.
Notice of Allowance from U.S. Appl. No. 14/218,551, mailed Mar. 1, 2017, 7 pages.
Notice of Allowance from U.S. Appl. No. 14/268,733, mailed Jan. 20, 2017, 62 pages.
Notice of Allowance from U.S. Appl. No. 14/448,868, mailed Apr. 27, 2017, 62 pages.
Notice of Allowance from U.S. Appl. No. 14/448,868, mailed Mar. 23, 2017, 57 pages.
Notice of Allowance from U.S. Appl. No. 14/487,992, mailed Apr. 12, 2017, 14 pages.
Notice of Allowance from U.S. Appl. No. 14/487,992, mailed Dec. 27, 2016, 28 pages.
Office Action from foreign counterpart Taiwan Patent Application No. 102148853, mailed Feb. 17, 2017, 9 pages.
Partial Supplementary European Search Report from European Patent Application No. 14770682.4, mailed Oct. 14, 2016, 8 pages.
TechTarget, What is network perimeter? Definition from WhatIs.com downloaded from http://searchnetworking.techtarget.com/definition/network-perimeter on Apr. 14, 2017, 5 pages.
Notice of Allowance from U.S. Appl. No. 14/448,868, dated Jun. 26, 2017, 14 pages.
Notice of Allowance from U.S. Appl. No. 14/487,992, dated Jun. 14, 2017, 14 pages.

\* cited by examiner

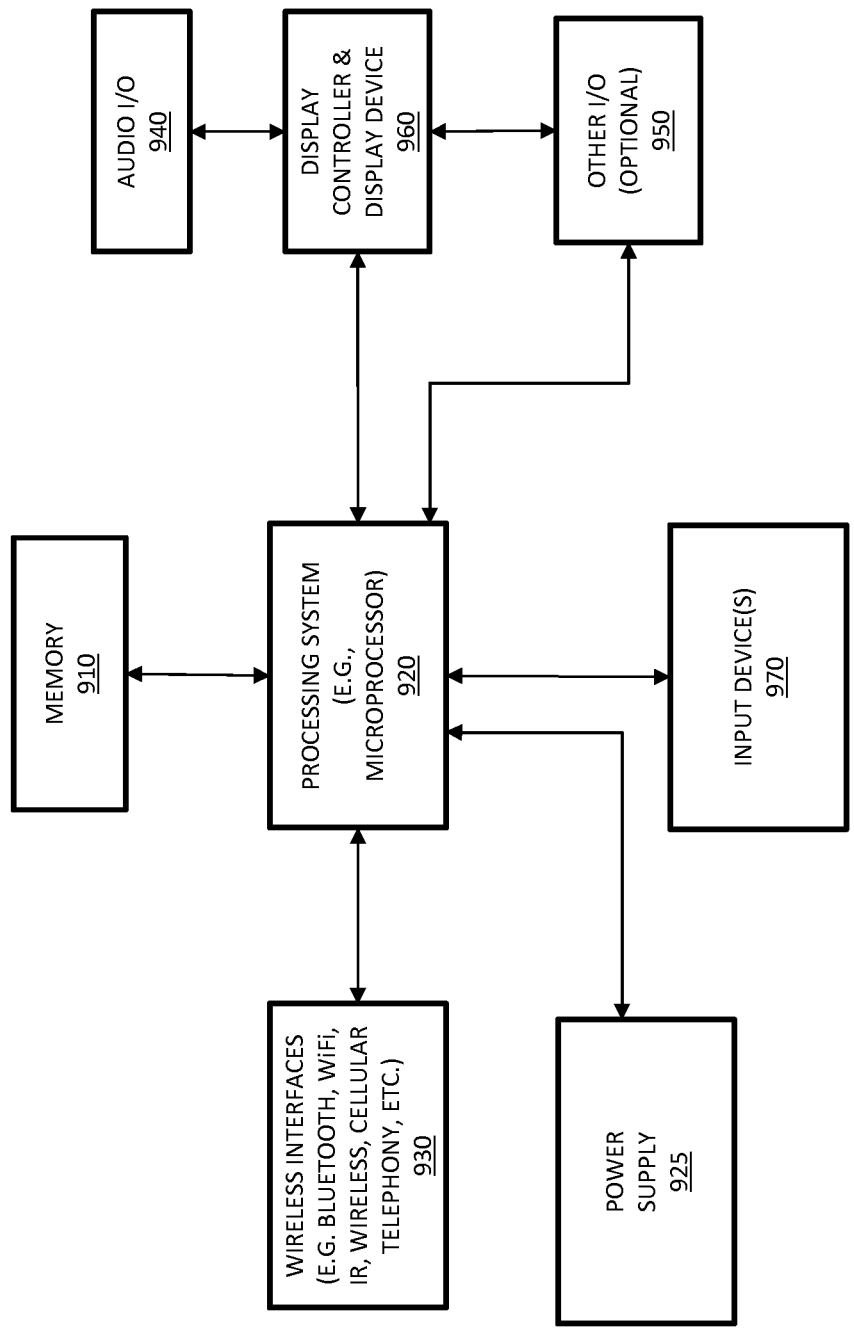

SYSTEM AND METHOD FOR IMPLEMENTING A ONE-TIME-PASSWORD USING ASYMMETRIC CRYPTOGRAPHY

BACKGROUND

Field of the Invention

This invention relates generally to the field of data processing systems. More particularly, the invention relates to a system and method for implementing a one-time password using asymmetric cryptography.

Description of Related Art

Systems have also been designed for providing secure user authentication over a network using biometric sensors. In such systems, the a score generated by an authenticator, and/or other authentication data, may be sent over a network to authenticate the user with a remote server. For example, Patent Application No. 2011/0082801 ("'801 Application") describes a framework for user registration and authentication on a network which provides strong authentication (e.g., protection against identity theft and phishing), secure transactions (e.g., protection against "malware in the browser" and "man in the middle" attacks for transactions), and enrollment/management of client authentication tokens (e.g., fingerprint readers, facial recognition devices, smartcards, trusted platform modules, etc).

The assignee of the present application has developed a variety of improvements to the authentication framework described in the '801 application. Some of these improvements are described in the following set of US patent applications, which are assigned to the present assignee: Ser. No. 13/730,761, Query System and Method to Determine Authentication Capabilities; Ser. No. 13/730,776, System and Method for Efficiently Enrolling, Registering, and Authenticating With Multiple Authentication Devices; Ser. No. 13/730,780, System and Method for Processing Random Challenges Within an Authentication Framework; Ser. No. 13/730,791, System and Method for Implementing Privacy Classes Within an Authentication Framework; Ser. No. 13/730,795, System and Method for Implementing Transaction Signaling Within an Authentication Framework; and Ser. No. 14/218,504, Advanced Authentication Techniques and Applications (hereinafter "'504 Application"). These applications are sometimes referred to herein as the ("Co-pending Applications").

Briefly, the Co-Pending applications describe authentication techniques in which a user enrolls with authentication devices (or Authenticators) such as biometric devices (e.g., fingerprint sensors) on a client device. When a user enrolls with a biometric device, biometric reference data is captured (e.g., by swiping a finger, snapping a picture, recording a voice, etc). The user may subsequently register/provision the authentication devices with one or more servers over a network (e.g., Websites or other relying parties equipped with secure transaction services as described in the Co-Pending Applications); and subsequently authenticate with those servers using data exchanged during the registration process (e.g., cryptographic keys provisioned into the authentication devices). Once authenticated, the user is permitted to perform one or more online transactions with a Website or other relying party. In the framework described in the Co-Pending Applications, sensitive information such as fingerprint data and other data which can be used to uniquely identify the user, may be retained locally on the user's authentication device to protect a user's privacy.

The '504 Application describes a variety of additional techniques including techniques for designing composite authenticators, intelligently generating authentication assurance levels, using non-intrusive user verification, transferring authentication data to new authentication devices, augmenting authentication data with client risk data, and adaptively applying authentication policies, and creating trust circles, to name just a few.

BRIEF DESCRIPTION OF THE DRAWINGS

A better understanding of the present invention can be obtained from the following detailed description in conjunction with the following drawings, in which:

FIG. 9 illustrates another exemplary data processing architecture for implementing the clients and/or servers described herein;

DETAILED DESCRIPTION OF PREFERRED EMBODIMENTS

Figure 1A:
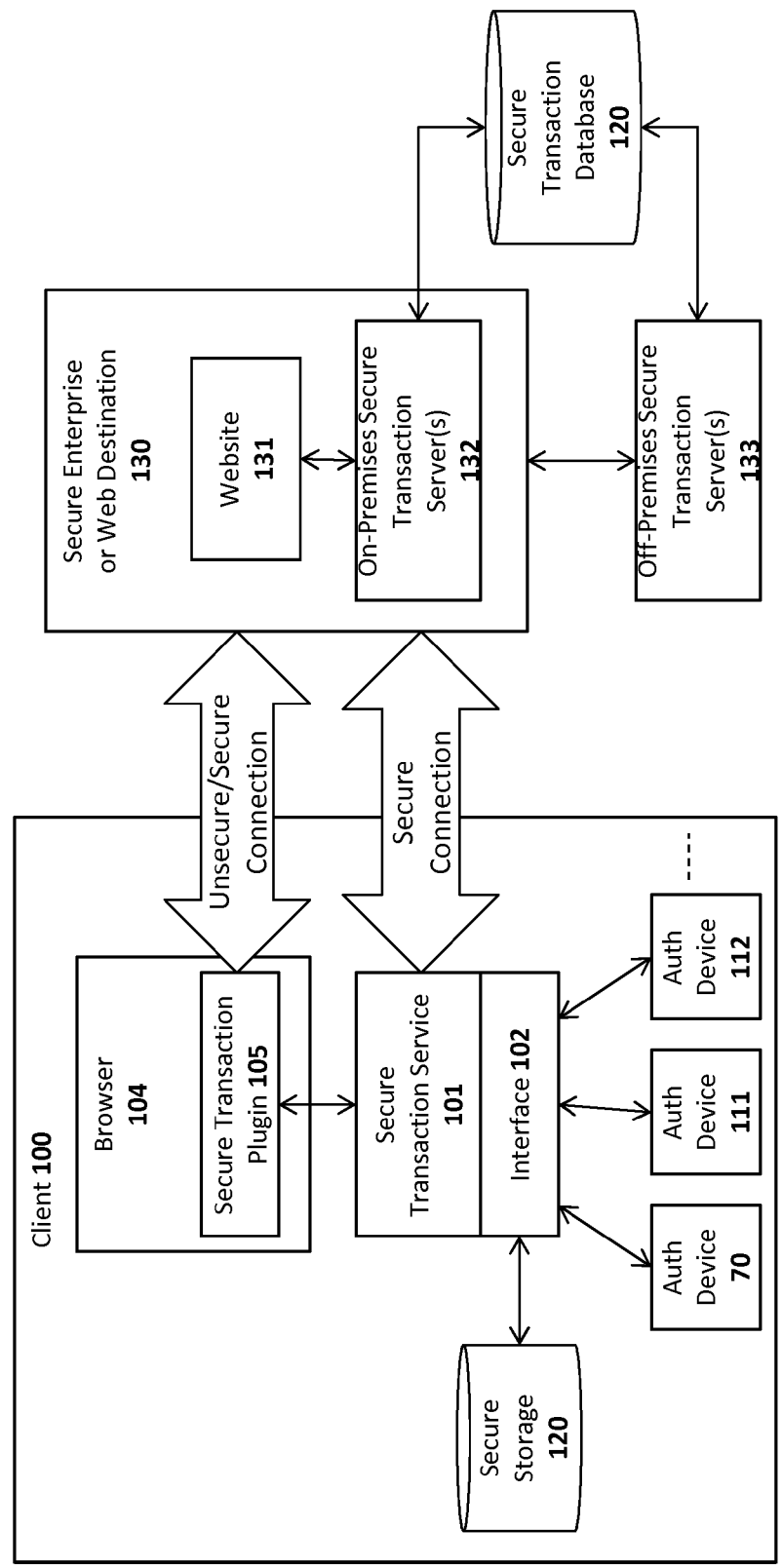
FIGS. 1A-B illustrate two different embodiments of a secure authentication system architecture.

Described below are embodiments of an apparatus, method, and machine-readable medium for implementing advanced authentication techniques and associated applications. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are not shown or are shown in a block diagram form to avoid obscuring the underlying principles of the present invention.

The embodiments of the invention discussed below involve authentication devices with user verification capabilities such as biometric modalities or PIN entry. These devices are sometimes referred to herein as "tokens," "authentication devices," or "authenticators." While certain embodiments focus on facial recognition hardware/software (e.g., a camera and associated software for recognizing a user's face and tracking a user's eye movement), some embodiments may utilize additional biometric devices including, for example, fingerprint sensors, voice recognition hardware/software (e.g., a microphone and associated software for recognizing a user's voice), and optical recognition capabilities (e.g., an optical scanner and associated software for scanning the retina of a user). The user verification capabilities may also include non-biometric modalities, like PIN entry. The authenticators might use devices like trusted platform modules (TPMs), smartcards and secure elements for cryptographic operations and key storage.

In a mobile biometric implementation, the biometric device is remote from the relying party. As used herein, the term "remote" means that the biometric sensor is not part of the security boundary of the computer it is communicatively coupled to (e.g., it is not embedded into the same physical enclosure as the relying party computer). By way of example, the biometric device may be coupled to the relying party via a network (e.g., the Internet, a wireless network link, etc) or via a peripheral input such as a USB port. Under these conditions, there may be no way for the relying party to know if the device is one which is authorized by the relying party (e.g., one which provides an acceptable level of authentication strength and integrity protection) and/or whether a hacker has compromised or even replaced the biometric device. Confidence in the biometric device depends on the particular implementation of the device.

The term "local" is used herein to refer to the fact that the user is completing a transaction in person, at a particular location such as at an automatic teller machine (ATM) or a point of sale (POS) retail checkout location. However, as discussed below, the authentication techniques employed to authenticate the user may involve non-location components such as communication over a network with remote servers and/or other data processing devices. Moreover, while specific embodiments are described herein (such as an ATM and retail location) it should be noted that the underlying principles of the invention may be implemented within the context of any system in which a transaction is initiated locally by an end user.

The term "relying party" is sometimes used herein to refer, not merely to the entity with which a user transaction is attempted (e.g., a Website or online service performing user transactions), but also to the secure transaction servers (sometimes referred to as "au implemented on behalf of that entity which may performed the underlying authentication techniques described herein. The secure transaction servers may be owned and/or under the control of the relying party or may be under the control of a third party offering secure transaction services to the relying party as part of a business arrangement.

The term "server" is used herein to refer to software executed on a hardware platform (or across multiple hardware platforms) that receives requests over a network from a client, responsively performs one or more operations, and transmits a response to the client, typically including the results of the operations. The server responds to client requests to provide, or help to provide, a network "service" to the clients. Significantly, a server is not limited to a single computer (e.g., a single hardware device for executing the server software) and may, in fact, be spread across multiple hardware platforms, potentially at multiple geographical locations.

Exemplary System Architectures and Transactions

Figure 1B:
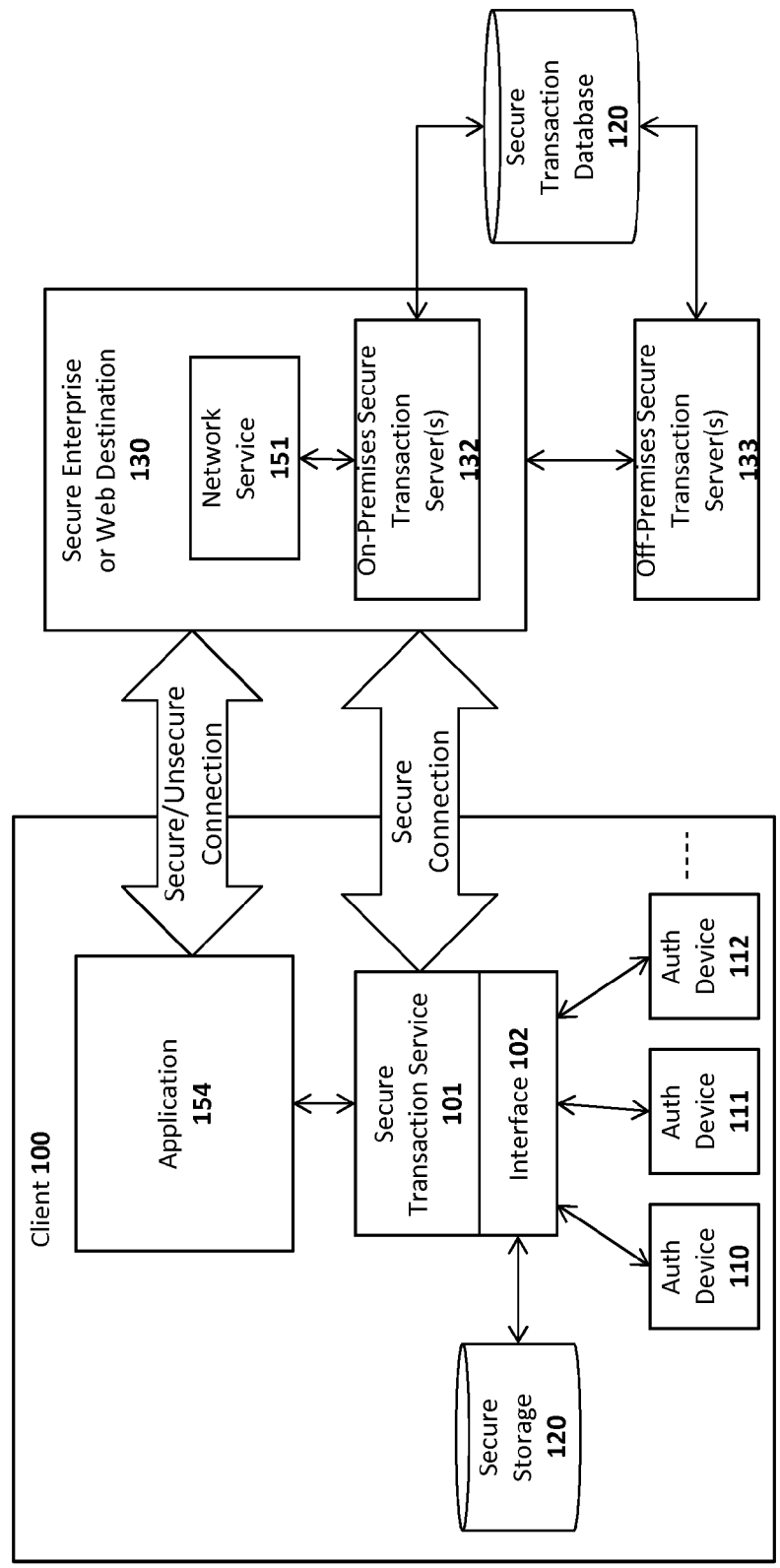

FIGS. 1A-B illustrate two embodiments of a system architecture comprising client-side and server-side components for registering/provisioning authenticating devices (also sometimes referred to as "provisioning") and authenticating a user. The embodiment shown in FIG. 1A uses a web browser plugin-based architecture for communicating with a website while the embodiment shown in FIG. 1B does not require a web browser. The various techniques described herein such as enrolling a user with authentication devices, registering/provisioning the authentication devices with a secure server, and verifying a user may be implemented on either of these system architectures. Thus, while the architecture shown in FIG. 1A is used to demonstrate the operation of several of the embodiments described below, the same basic principles may be easily implemented on the system shown in FIG. 1B (e.g., by removing the browser plugin 105 as the intermediary for communication between the server 130 and the secure transaction service 101 on the client).

Turning first to FIG. 1A, the illustrated embodiment includes a client 100 equipped with one or more authentication devices 110-112 (sometimes referred to in the art as authentication "tokens" or "Authenticators") for enrolling and verifying an end user. As mentioned above, the authentication devices 110-112 may include biometric device such as fingerprint sensors, voice recognition hardware/software (e.g., a microphone and associated software for recognizing a user's voice), facial recognition hardware/software (e.g., a camera and associated software for recognizing a user's face), and optical recognition capabilities (e.g., an optical scanner and associated software for scanning the retina of a user) and support for non-biometric modalities, such as PIN verification. The authentication devices might use trusted platform modules (TPMs), smartcards or secure elements for cryptographic operations and key storage.

The authentication devices 110-112 are communicatively coupled to the client through an interface 102 (e.g., an application programming interface or API) exposed by a secure transaction service 101. The secure transaction service 101 is a secure application for communicating with one or more secure transaction servers 132-133 over a network and for interfacing with a secure transaction plugin 105 executed within the context of a web browser 104. As illustrated, the Interface 102 may also provide secure access to a secure storage device 120 on the client 100 which stores information related to each of the authentication devices 110-112 such as a device identification code, user identification code, user enrollment data (e.g., scanned fingerprint or other biometric data) protected by the authentication device, and keys wrapped by the authentication device used to perform the secure authentication techniques described herein. For example, as discussed in detail below, a unique key may be stored into each of the authentication devices and used when communicating to servers 130 over a network such as the Internet.

As discussed below, certain types of network transactions are supported by the secure transaction plugin 105 such as HTTP or HTTPS transactions with websites 131 or other servers. In one embodiment, the secure transaction plugin is initiated in response to specific HTML tags inserted into the HTML code of a web page by the web server 131 within the secure enterprise or Web destination 130 (sometimes simply referred to below as "server 130"). In response to detecting such a tag, the secure transaction plugin 105 may forward transactions to the secure transaction service 101 for processing. In addition, for certain types of transactions (e.g., such as secure key exchange) the secure transaction service 101 may open a direct communication channel with the on-premises transaction server 132 (i.e., co-located with the website) or with an off-premises transaction server 133.

The secure transaction servers 132-133 are coupled to a secure transaction database 120 for storing user data, authentication device data, keys and other secure information needed to support the secure authentication transactions described below. It should be noted, however, that the underlying principles of the invention do not require the separation of logical components within the secure enterprise or web destination 130 shown in FIG. 1A. For example, the website 131 and the secure transaction servers 132-133 may be implemented within a single physical server or separate physical servers. Moreover, the website 131 and transaction servers 132-133 may be implemented within an integrated software module executed on one or more servers for performing the functions described below.

As mentioned above, the underlying principles of the invention are not limited to a browser-based architecture shown in FIG. 1A. FIG. 1B illustrates an alternate implementation in which a stand-alone application 154 utilizes the functionality provided by the secure transaction service 101 to authenticate a user over a network. In one embodiment, the application 154 is designed to establish communication sessions with one or more network services 151 which rely on the secure transaction servers 132-133 for performing the user/client authentication techniques described in detail below.

In either of the embodiments shown in FIGS. 1A-B, the secure transaction servers 132-133 may generate the keys which are then securely transmitted to the secure transaction service 101 and stored into the authentication devices within the secure storage 120. Additionally, the secure transaction servers 132-133 manage the secure transaction database 120 on the server side.

Certain basic principles associated with remotely provisioning authentication devices and authenticating with a relying party will be described with respect to FIGS. 2-5, followed by a detailed description of embodiments of the invention for establishing trust using secure communication protocols.

Figure 2:
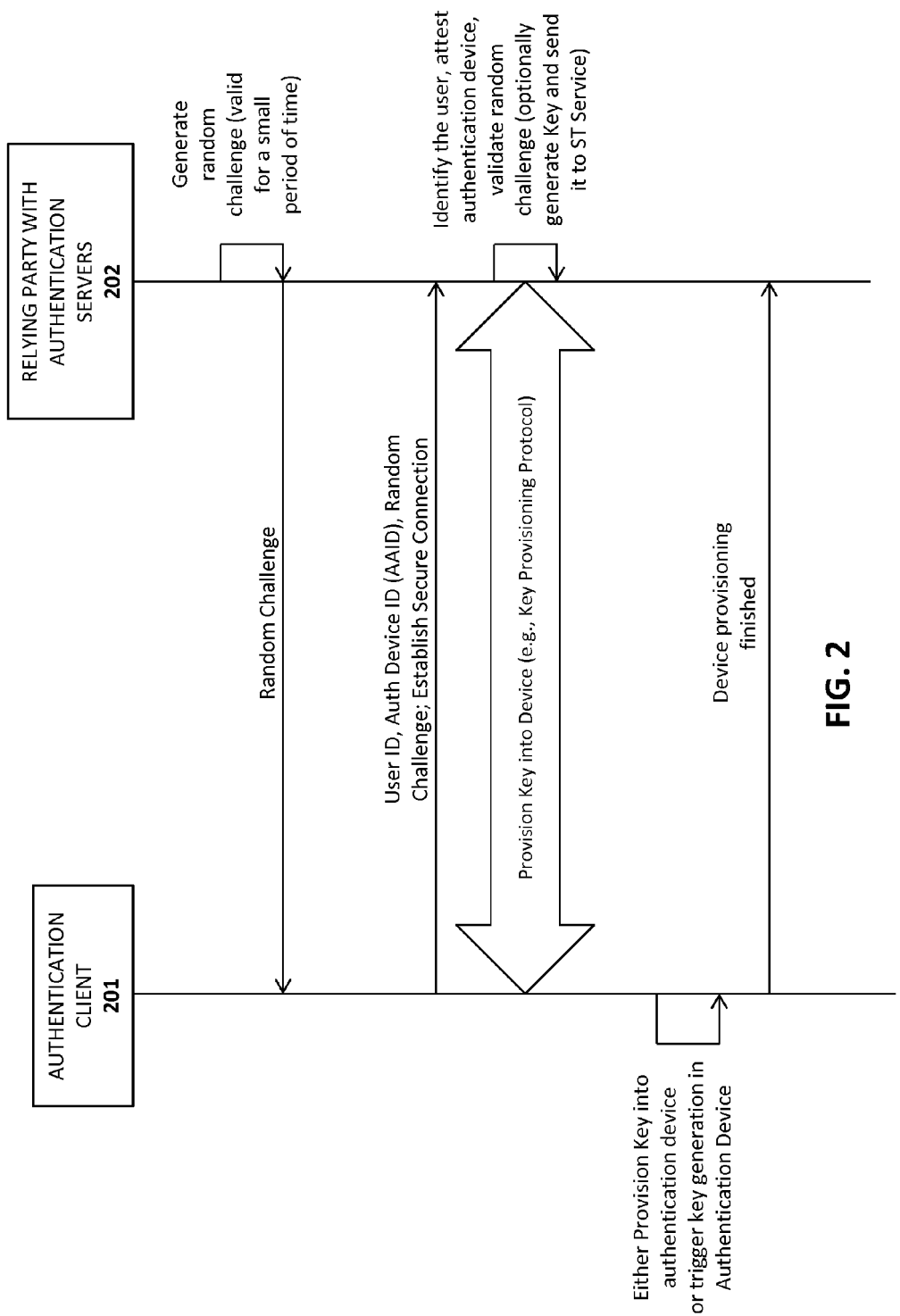
FIG. 2 is a transaction diagram showing how keys may be provisioned into authentication devices.

FIG. 2 illustrates a series of transactions for provisioning authentication devices on a client (such as devices 110-112 on client 100 in FIGS. 1A-B). "Provisioning" is sometimes also referred to as "registering." For simplicity, the secure transaction service 101 and interface 102 are combined together as authentication client 201 and the secure enterprise or web destination 130 including the secure transaction servers 132-133 are represented as a relying party 202.

During provisioning of an authenticator (e.g., a fingerprint authenticator, voice authenticator, etc), a key associated with the authenticator is shared between the authentication client 201 and the relying party 202. Referring back to FIGS. 1A-B, the key may be stored within the secure storage 120 of the client 100 and the secure transaction database 120 used by the secure transaction servers 132-133. In one embodiment, the key is a symmetric key generated by one of the secure transaction servers 132-133. However, in another embodiment discussed below, asymmetric keys are be used. In this embodiment, the public/private key pair may be generated by the secure transaction servers 132-133. The public key may then be stored by the secure transaction servers 132-133 and the related private key may be stored in the secure storage 120 on the client. In an alternate embodiment, the key(s) may be generated on the client 100 (e.g., by the authentication device or the authentication device interface rather than the secure transaction servers 132-133). The underlying principles of the invention are not limited to any particular types of keys or manner of generating the keys.

A secure key provisioning protocol is employed in one embodiment to share the key with the client over a secure communication channel. One example of a key provisioning protocol is the Dynamic Symmetric Key Provisioning Protocol (DSKPP) (see, e.g., Request for Comments (RFC) 6063). However, the underlying principles of the invention are not limited to any particular key provisioning protocol.

In one particular embodiment, the client generates a public/private key pair and sends the public key to the server, which may be attested with an attestation key.

Turning to the specific details shown in FIG. 2, to initiate the registration process, the relying party 202 generates a randomly generated challenge (e.g., a cryptographic nonce) that must be presented by the authentication client 201 during device registration. The random challenge may be valid for a limited period of time. In response, the authentication client 201 initiates an out-of-band secure connection with the relying party 202 (e.g., an out-of-band transaction) and communicates with the relying party 202 using the key provisioning protocol (e.g., the DSKPP protocol mentioned above). To initiate the secure connection, the authentication client 201 may provide the random challenge back to the relying party 202 (potentially with a signature generated over the random challenge). In addition, the authentication client 201 may transmit the identity of the user (e.g., a user ID or other code) and the identity of the authentication device(s) to be provisioned registered (e.g., using the authentication attestation ID (AAID) which uniquely identify the type of authentication device(s) being provisioned).

The relying party locates the user with the user name or ID code (e.g., in a user account database), validates the random challenge (e.g., using the signature or simply comparing the random challenge to the one that was sent), validates the authentication device's authentication code if one was sent (e.g., the AAID), and creates a new entry in a secure transaction database (e.g., database 120 in FIGS. 1A-B) for the user and the authentication device(s). In one embodiment, the relying party maintains a database of authentication devices which it accepts for authentication. It may query this database with the AAID (or other authentication device(s) code) to determine if the authentication device(s) being provisioned are acceptable for authentication. If so, then it will proceed with the registration process.

In one embodiment, the relying party 202 generates an authentication key for each authentication device being provisioned. It writes the key to the secure database and sends the key back to the authentication client 201 using the key provisioning protocol. Once complete, the authentication device and the relying party 202 share the same key if a symmetric key was used or different keys if asymmetric keys were used. For example, if asymmetric keys were used, then the relying party 202 may store the public key and provide the private key to the authentication client 201. Upon receipt of the private key from the relying party 202, the authentication client 201 provisions the key into the authentication device (storing it within secure storage associated with the authentication device). It may then use the key during authentication of the user (as described below). In an alternate embodiment, the key(s) are generated by the authentication client 201 and the key provisioning protocol is used to provide the key(s) to the relying party 202. In either case, once provisioning is complete, the authentication client 201 and relying party 202 each have a key and the authentication client 201 notifies the relying party of the completion.

Figure 3:
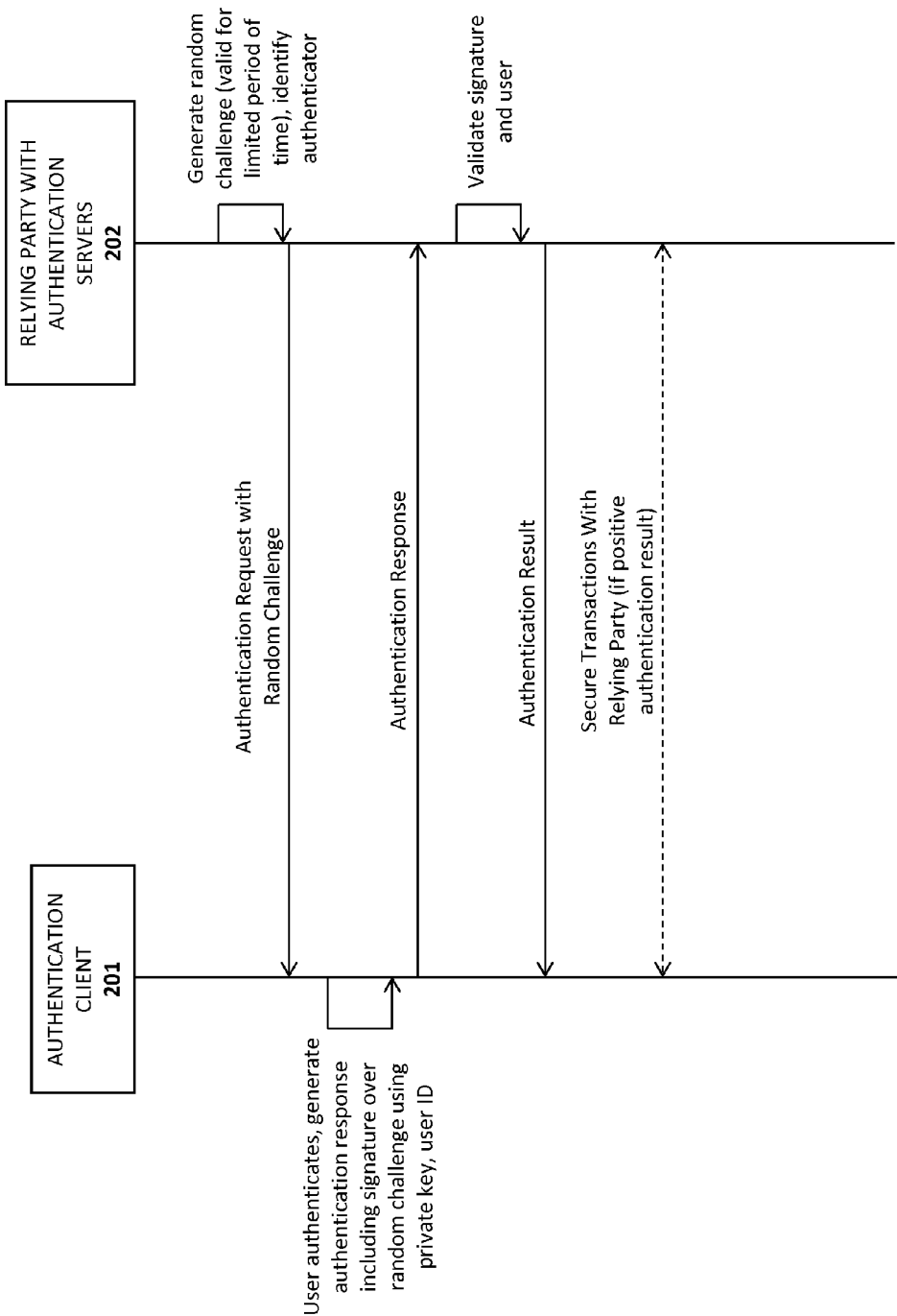
FIG. 3 illustrates a transaction diagram showing remote authentication.

FIG. 3 illustrates a series of transactions for user authentication with the provisioned authentication devices. Once device registration is complete (as described in FIG. 2), the relying party 201 will accept an authentication response (sometimes referred to as a "token") generated by the local authentication device on the client as a valid authentication response.

Turning to the specific details shown in FIG. 3, in response to the user initiating a transaction with the relying party 202 which requires authentication (e.g., initiating payment from the relying party's website, accessing private user account data, etc), the relying party 202 generates an authentication request which includes a random challenge (e.g., a cryptographic nonce). In one embodiment, the random challenge has a time limit associated with it (e.g., it is valid for a specified period of time). The relying party may also identify the authenticator to be used by the authentication client 201 for authentication. As mentioned above, the relying party may provision each authentication device available on the client and stores a public key for each provisioned authenticator. Thus, it may use the public key of an authenticator or may use an authenticator ID (e.g., AAID) to identify the authenticator to be used. Alternatively, it may provide the client with a list of authentication options from which the user may select.

In response to receipt of the authentication request, the user may be presented with a graphical user interface (GUI) requesting authentication (e.g., in the form of a web page or a GUI of an authentication application/app). The user then performs the authentication (e.g., swiping a finger on a fingerprint reader, etc). In response, the authentication client 201 generates an authentication response containing a signature over the random challenge with the private key associated with the authenticator. It may also include other relevant data such as the user ID code in the authentication response.

Upon receipt of the authentication response, the relying party may validate the signature over the random challenge (e.g., using the public key associated with the authenticator) and confirm the identity of the user. Once authentication is complete, the user is permitted to enter into secure transactions with the relying party, as illustrated.

A secure communication protocol such as Transport Layer Security (TLS) or Secure Sockets Layer (SSL) may be used to establish a secure connection between the relying party 201 and the authentication client 202 for any or all of the transactions illustrated in FIGS. 2-3.

System and Method for Implementing a One-Time-Password Using Asymmetric Cryptography The embodiments of the invention described below include techniques for implementing a One-Time-Password (OTP) using asymmetric cryptography. OTP schemes are typically based on symmetric key cryptography where the client and server entities share a single symmetric key and derive the OTP using the same key. In contrast, the disclosed embodiments are based on asymmetric keys which allow the implementation of more secure servers without the need to store secrets.

There are three types of One Time Passwords (OTP) schemes that are currently widely used: (1) time-based OTP (TOTP); (2) counter-based OTP; (3) challenge/response-based OTP. Current solutions use symmetric key based schemes for all of these types of OTPs. Under this scheme, an OTP device and the server are pre-provisioned with the same symmetric key. In response to an authentication event, the OTP device generates a special cryptographic response based on (1) time, (2) a built-in counter, or (3) a server-provided challenge and provides this response to the server for verification. The server then uses the same symmetric key to derive the same cryptographic value and compares it with the one provided by the OTP device. If these match, then the authentication is considered successful.

One particular use case involves "offline" authentication which is applicable to scenarios where the OTP device does not have direct connectivity with the server. After an OTP device generates a cryptographic response it truncates the response into a 6-digit number which is then shown to the user. The user enters the 6-digit number into client device and the latter sends this number to server. The server then uses the same truncation algorithm to derive the same number. After the number is derived, it compares the derived number with the one generated by OTP device. However, since the server stores a secret key it is an attack target for hackers. Maintaining secret keys in the server typically requires the use of expensive hardware security modules (HSMs) in the data centers.

One embodiment of the invention implements an OTP scheme which is based on asymmetric cryptography. The advantage of asymmetric cryptography is that the server will store a public key rather than a private key (such as symmetric key). This removes the burden of protecting the confidential properties of the key in the server and allows easier and more secure deployments.

Figure 4:
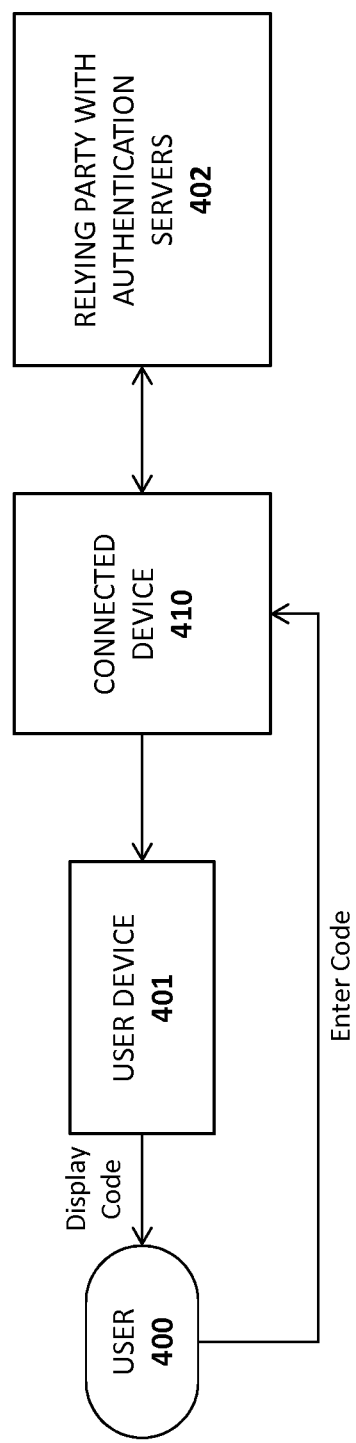
FIG. 4 illustrates a connected device configured between a relying party authentication server and a user device.

FIG. 4 provides an overview of a system architecture in accordance with one embodiment of the invention. In this embodiment, the user device 401 is the entity which stores a private key and generates authentication assertions and the connected device 410 is an entity that has connectivity with both a relying party authentication server 402 and a the user device 401. By way of example, in one embodiment, the user device 401 may be a mobile device such as an iPhone™ or Android™ device and the connected device 410 may be a desktop computer, a point-of-sale (PoS) terminal, automatic teller machine (ATM), or any other device which has connectivity with the relying party authentication server 402.

In one embodiment, the authentication server 402 stores a public key corresponding to the private key stored by the user device 401. The keys may be provisioned on the user device 401 and the authentication server 402 using the key provisioning techniques discussed above with respect to FIG. 2 (e.g., using DSKPP or other key provisioning protocol).

In one embodiment, the connectivity with user device 401 is one way; that is, the user device 401 can read messages from connected device 410 but cannot send messages back. For example, the connected device 410 may display a quick response (QR) code, barcode, or other optical code to convey information to the user device 401 (e.g., such as the encrypted challenge discussed below). The user device 401 may read and interpret the optical code using known techniques (e.g., capturing the optical code with a camera or scanner device).

In an alternate embodiment, the connection between the user device 401 and connected device 410 is a bi-directional connection implemented using a local communication technology such as Near Field Communication (NFC), Bluetooth (e.g., Bluetooth Low Energy (BTLE)), or Wireless USB.

In one embodiment, the relying party authentication server 402 is the entity that verifies cryptographic assertions generated by the user device 401. However, the user device 401 does not need to have direct connectivity with the authentication server 402. The embodiments of the invention include two phases: provisioning and authentication. In the provisioning phase, the user device 401 and authentication server 402 are provisioned with cryptographic keys (e.g., using key provisioning techniques such as shown in FIG. 2). However, unlike existing OTP schemes, during provisioning the authentication server 402 is provided with a public key and the user device 401 is provided with a private key.

Figure 5:
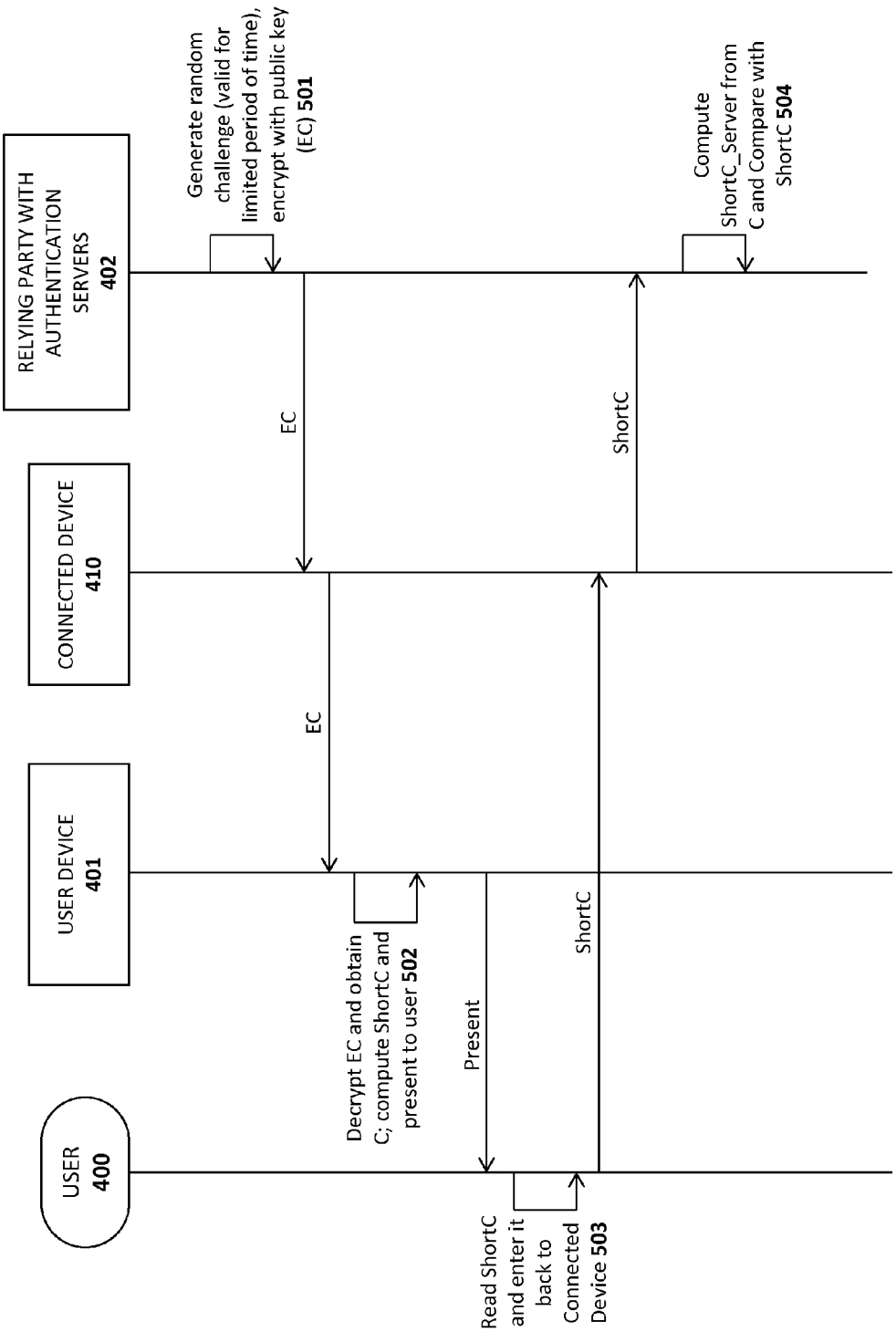
FIG. 5 illustrates one embodiment of the invention for implementing a one-time-password using asymmetric cryptography.

Assuming that the user device 401 is already provisioned with a private key and the authentication server 402 is provisioned with the corresponding public key, one embodiment of the invention operates in accordance with the transaction diagram shown in FIG. 5.

At 501, the relying party authentication server 402 generates a random challenge (C) and encrypts it with the a public key corresponding to the private key stored on the user device 401: EC=Encrypt (PublicKey, C), where C is the random challenge and EC is the encrypted challenge. The authentication server 402 stores C in its storage and sends the EC to the connected device 410 which communicates the EC to the user device 401 as illustrated.

At 502, the user device 401 decrypts EC with its private key and obtains the random challenge: C=Decrypt (PrivateKey, EC). The user device 401 then converts C into a simplified value such as a shortened version of C ("ShortC"). In one embodiment, this is accomplished by truncating C into an N-digit number (e.g., where N=6): ShortC=Truncate(C). However, various other techniques may be implemented to convert C into ShortC while still complying with the underlying principles of the invention. For example, in one embodiment, bits from certain specified bit positions may be selected from C and combined to form ShortC.

After ShortC is presented to the user 400 at 503 (e.g., on the user device's 401's display), the user 400 enters ShortC on the connected device 410 which sends it back to the authentication server 402 in an authentication response message. The user device 401 may also request that the user perform authentication at this stage (e.g., using an authenticator on the user device 401 such as a fingerprint reader).

Upon receipt of the authentication response message containing ShortC, at 504, the authentication server reads C from storage and truncates C with the same algorithm as the user device 401. For example: ShortC_Server=Truncate(C) (if truncation is used to generate ShortC). The authentication server 402 then compares ShortC received form the user device 401 with ShortC_Server. If they match, then the user authentication is successful. If not, then authentication fails.

Figure 6A:
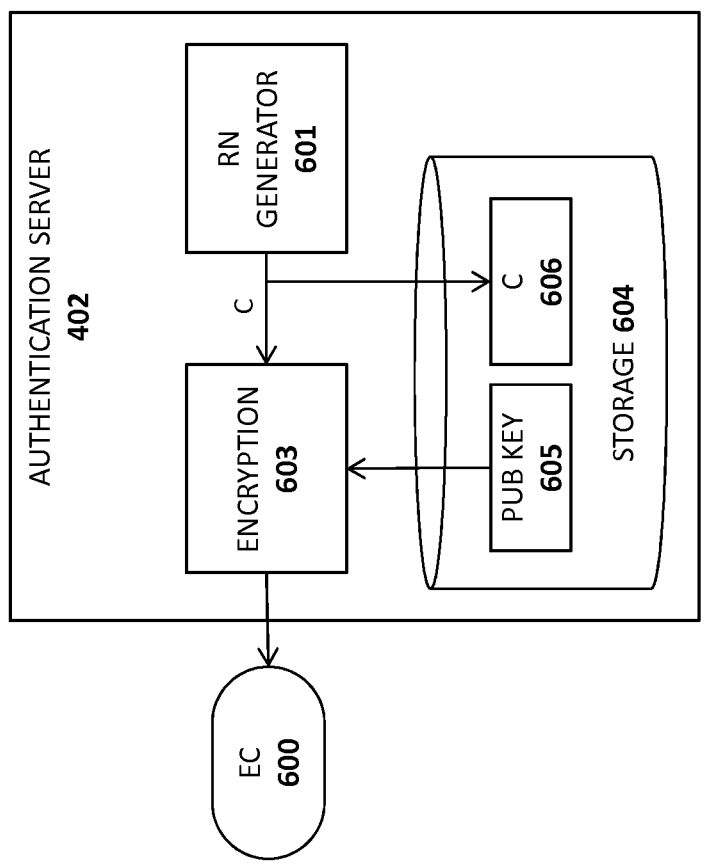
FIG. 6A-B illustrate additional details of one embodiment of the authentication server.

One embodiment of the authentication server 402 is shown in FIG. 6A. As illustrated, the public key 605 associated with the private key on the user device may be stored in secure storage 604 and used by an encryption module 603 to encrypt the random challenge (C) 606. As indicated, a random number generator 601 may be used to generate C 606 which may then be stored in the secure storage 604 (and later retrieved upon receipt of the authentication response). As mentioned the encrypted random challenge (EC) is then transmitted to the connected device.

Figure 6B:
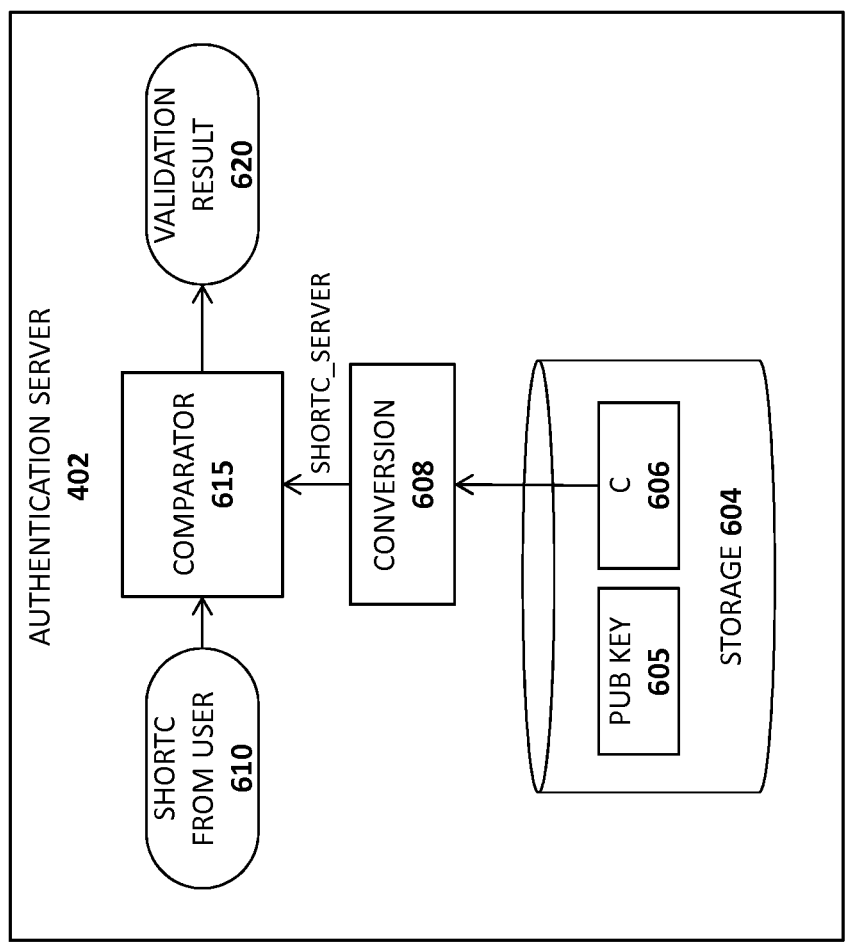

FIG. 6B illustrates components employed in one embodiment of the authentication server 402 to validate the authentication response including ShortC sent by the user 610. In one embodiment, conversion logic 608 reads C from storage 604 and truncates C with the same algorithm as used by the user device 401 to generate ShortC: ShortC_Server=Truncate(C). Comparator logic 615 then compares ShortC 610 received form the user with ShortC_Server. If they match, then the user authentication is successful. If not, then authentication fails.

Figure 7:
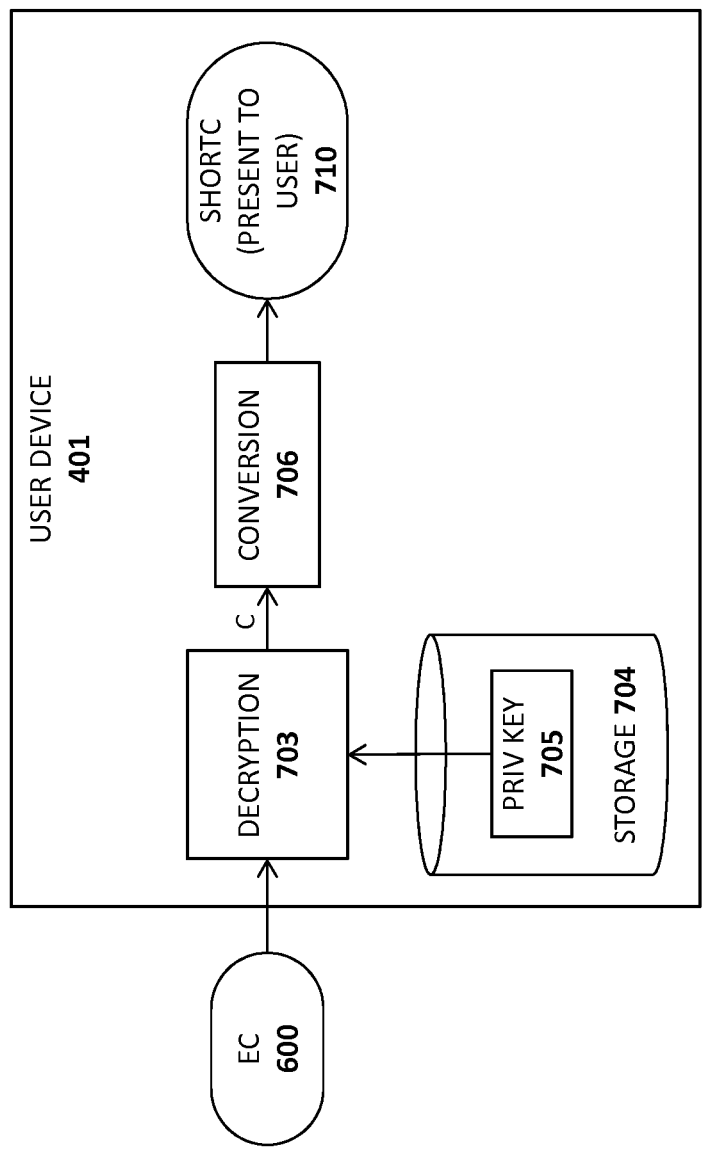
FIG. 7 illustrates additional details of one embodiment of the user device.

FIG. 7 illustrates the logic employed on the user device 401 in accordance with one embodiment of the invention. A decryption module 703 decrypts the encrypted challenge (EC) 600 sent from the authentication server 402 using a private key 705 stored in a secure storage 704. As mentioned, the private key 705 corresponds to the public key 605 used to perform the encryption. A conversion module 706 then converts the decrypted random challenge, C, to arrive at ShortC 710, which is presented to the user. As mentioned, while truncation is used in one embodiment, the underlying principles of the invention are not limited to any particular type of binary or numeric conversion.

Although several specific details are set forth above, various different encryption implementations, conversion techniques, and random challenges may be employed while still complying with the underlying principles of the invention. For example, the asymmetric algorithm may be a public key cryptographic algorithm such as RSA, elliptic curve cryptography (ECC) or other algorithms implementing encryption with asymmetric keys. In one embodiment, the Advanced Encryption Standard (AES) is used with a key length of 128 or 256 bits. In addition, the connected device 410 may communicate the EC to the user device 401 via QR codes, NFC, Bluetooth, WiFi, or any other communication technology.

In one embodiment, the authentication server 402 does not explicitly store C as described above, but sends it to the client device 401 together with EC by incorporating mechanisms such as time-stamping, wrapping and similar techniques for further verification. For example:

$$C'=E(\text{ServerWrappingKey}, C/\text{Timestamp}) \text{ and } EC=E(\text{PublicKey}, C)$$

Moreover, the relying party described above (i.e., the entity with authentication servers for implementing the embodiments of the invention invention) may be any entity including an online service provider, online retail service, or enterprise server.

In one embodiment, the software running on the connected device 410 and communicating with the authentication server 402 may be implemented in a Web browser or a proprietary application (e.g., an App designed specifically to communicate with the relying party and its authentication servers). Additionally, the software running on the user device (see, e.g., FIG. 7), reading the EC 600 from the connected device and displaying the ShortC may be implemented in a Web browser or a proprietary application. Moreover, in one embodiment, the logic residing on the user device 401 to securely protect the private key 705 and derive ShortC without revealing the private key to other components is implemented in hardware or as firmware implemented on cryptographic hardware (such as a smart card).

Exemplary Data Processing Devices

Figure 8:
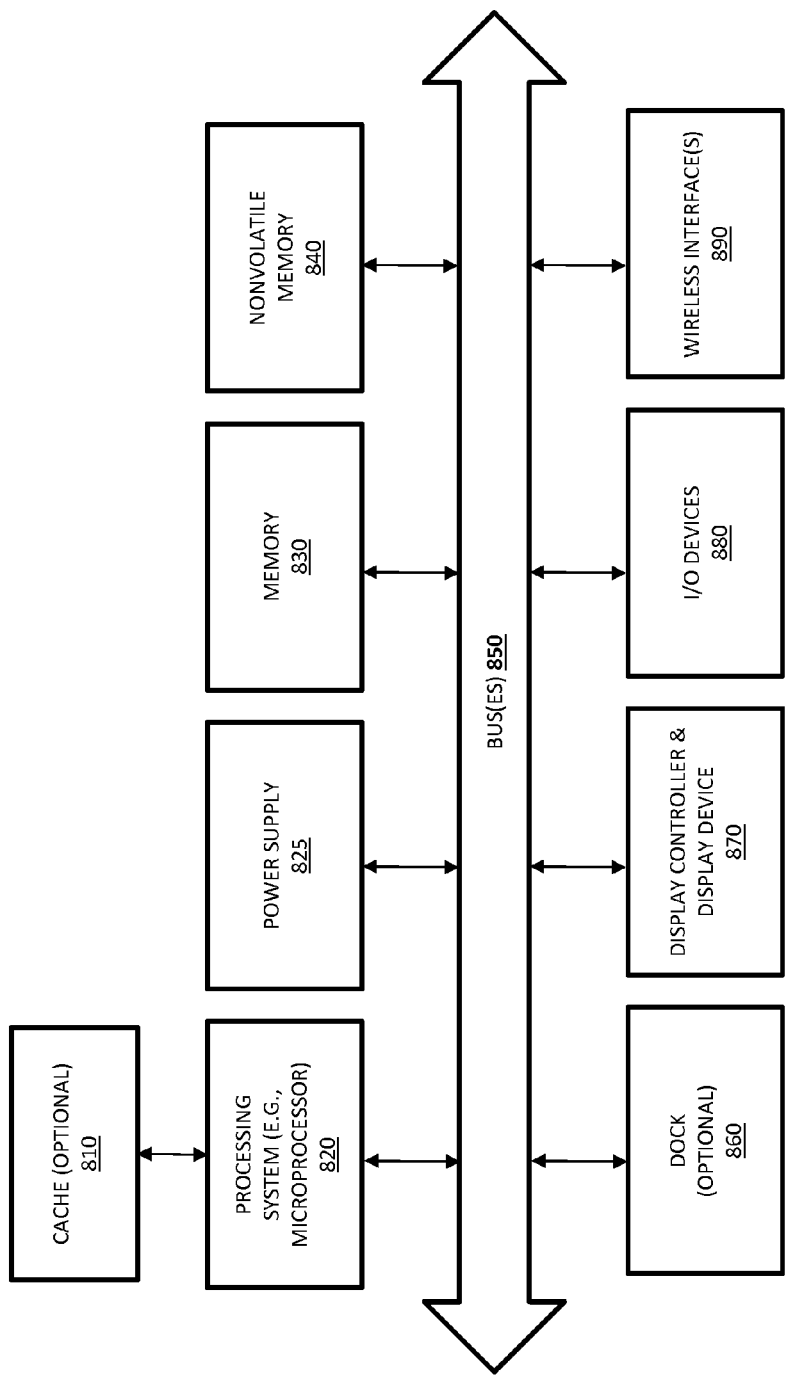
FIG. 8 illustrates an exemplary data processing architecture for implementing the clients and/or servers described herein.

FIG. 8 is a block diagram illustrating an exemplary clients and servers which may be used in some embodiments of the invention. It should be understood that while FIG. 8 illustrates various components of a computer system, it is not intended to represent any particular architecture or manner of interconnecting the components as such details are not germane to the present invention. It will be appreciated that other computer systems that have fewer components or more components may also be used with the present invention.

As illustrated in FIG. 8, the computer system 800, which is a form of a data processing system, includes the bus(es) 850 which is coupled with the processing system 820, power supply 825, memory 830, and the nonvolatile memory 840 (e.g., a hard drive, flash memory, Phase-Change Memory (PCM), etc.). The bus(es) 850 may be connected to each other through various bridges, controllers, and/or adapters as is well known in the art. The processing system 820 may retrieve instruction(s) from the memory 830 and/or the nonvolatile memory 840, and execute the instructions to perform operations as described above. The bus 850 interconnects the above components together and also interconnects those components to the optional dock 860, the display controller & display device 870, Input/Output devices 880 (e.g., NIC (Network Interface Card), a cursor control (e.g., mouse, touchscreen, touchpad, etc.), a keyboard, etc.), and the optional wireless transceiver(s) 890 (e.g., Bluetooth, WiFi, Infrared, etc.).

FIG. 9 is a block diagram illustrating an exemplary data processing system which may be used in some embodiments of the invention. For example, the data processing system 900 may be a handheld computer, a personal digital assistant (PDA), a mobile telephone, a portable gaming system, a portable media player, a tablet or a handheld computing device which may include a mobile telephone, a media player, and/or a gaming system. As another example, the data processing system 900 may be a network computer or an embedded processing device within another device.

According to one embodiment of the invention, the exemplary architecture of the data processing system 900 may used for the mobile devices described above. The data processing system 900 includes the processing system 920, which may include one or more microprocessors and/or a system on an integrated circuit. The processing system 920 is coupled with a memory 910, a power supply 925 (which includes one or more batteries) an audio input/output 940, a display controller and display device 960, optional input/output 950, input device(s) 970, and wireless transceiver(s) 930. It will be appreciated that additional components, not shown in FIG. 9, may also be a part of the data processing system 900 in certain embodiments of the invention, and in certain embodiments of the invention fewer components than shown in FIG. 9 may be used. In addition, it will be appreciated that one or more buses, not shown in FIG. 9, may be used to interconnect the various components as is well known in the art.

The memory 910 may store data and/or programs for execution by the data processing system 900. The audio input/output 940 may include a microphone and/or a speaker to, for example, play music and/or provide telephony functionality through the speaker and microphone. The display controller and display device 960 may include a graphical user interface (GUI). The wireless (e.g., RF) transceivers 930 (e.g., a WiFi transceiver, an infrared transceiver, a Bluetooth transceiver, a wireless cellular telephony transceiver, etc.) may be used to communicate with other data processing systems. The one or more input devices 970 allow a user to provide input to the system. These input devices may be a keypad, keyboard, touch panel, multi touch panel, etc. The optional other input/output 950 may be a connector for a dock.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable program code. The machine-readable medium may include, but is not limited to, floppy diskettes, optical disks, CD-ROMs, and magneto-optical disks, ROMs, RAMs, EPROMs, EEPROMs, magnetic or optical cards, or other type of media/machine-readable medium suitable for storing electronic program code.

Throughout the foregoing description, for the purposes of explanation, numerous specific details were set forth in order to provide a thorough understanding of the invention. It will be apparent, however, to one skilled in the art that the invention may be practiced without some of these specific details. For example, it will be readily apparent to those of skill in the art that the functional modules and methods described herein may be implemented as software, hardware or any combination thereof. Moreover, although some embodiments of the invention are described herein within the context of a mobile computing environment, the underlying principles of the invention are not limited to a mobile computing implementation. Virtually any type of client or peer data processing devices may be used in some embodiments including, for example, desktop or workstation computers. Accordingly, the scope and spirit of the invention should be judged in terms of the claims which follow.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

I claim:

1. A method comprising:
    generating a challenge at a server;
    encrypting the challenge at the server using a public encryption key;
    transmitting the encrypted challenge to a connected device having a first connection over a network with the server;
    providing the encrypted challenge from the connected device to a user device;
    decrypting the encrypted challenge at the user device using a private encryption key corresponding to the public encryption key to determine the challenge;
    converting the challenge to a converted challenge, the converted challenge having a different format than the original challenge;
    receiving the converted challenge at the connected device and providing the converted challenge from the connected device to the server, wherein receiving the converted challenge at the connected device comprises receiving manual user entry of the converted challenge via a user input device coupled to the connected device; and
    validating the converted challenge at the server to authenticate the user.

2. The method as in claim 1 wherein the challenge comprises a random challenge generated by a random number generator on the server.

3. The method as in claim 2 wherein converting the challenge comprises truncating a portion of the challenge and using the truncated portion or a remaining portion following truncation for the converted challenge.

4. The method as in claim 3 wherein the challenge is truncated to generate a 6-digit converted challenge.

5. The method as in claim 3 wherein validating the converted challenge comprises truncating the same portion of the challenge on the server and comparing the converted challenge truncated on the server with the converted challenge provided from the connected device.

6. The method as in claim 1 wherein the connected device comprises a networked computer system, a point-of-sale (PoS) terminal, or an automatic teller machine (ATM).

7. The method as in claim 6 wherein the user device comprises a mobile smartphone device.

8. The method as in claim 7 wherein providing the encrypted challenge from the connected device to a user device comprises displaying an optical code on a display of the connected device and reading the optical code by the user device.

9. The method as in claim 8 wherein the optical code comprises a quick response (QR) code or a barcode.

10. The method as in claim 7 wherein providing the encrypted challenge from the connected device to a user device comprises establishing a local wireless communication channel between the user device and the connected device.

11. The method as in claim 10 wherein the local wireless channel comprises a Bluetooth channel, a near field communication (NFC) channel, a WiFi channel, or a wireless USB channel.

12. A system comprising:
 a server generating a challenge, the server encrypting the challenge using a public encryption key;
 the server transmitting the encrypted challenge to a connected device having a first connection over a network with the server;
 the connected device providing the encrypted challenge to a user device;
 the user device decrypting the encrypted challenge using a private encryption key corresponding to the public encryption key to determine the challenge;
 the user device converting the challenge to a converted challenge, the converted challenge having a different format than the original challenge;
 the connected device receiving the converted challenge and providing the converted challenge from the connected device to the server, wherein receiving the converted challenge at the connected device comprises receiving manual user entry of the converted challenge via a user input device coupled to the connected device; and
 the server validating the converted challenge to authenticate the user.

13. The system as in claim 12 wherein the challenge comprises a random challenge generated by a random number generator on the server.

14. The system as in claim 13 wherein converting the challenge comprises truncating a portion of the challenge and using the truncated portion or a remaining portion following truncation for the converted challenge.

15. The system as in claim 14 wherein the challenge is truncated to generate a 6-digit converted challenge.

16. The system as in claim 14 wherein validating the converted challenge comprises truncating the same portion of the challenge on the server and comparing the converted challenge truncated on the server with the converted challenge provided from the connected device.

17. The system as in claim 12 wherein the connected device comprises a networked computer system, a point-of-sale (PoS) terminal, or an automatic teller machine (ATM).

18. The system as in claim 17 wherein the user device comprises a mobile smartphone device.

19. The system as in claim 18 wherein providing the encrypted challenge from the connected device to a user device comprises displaying an optical code on a display of the connected device and reading the optical code by the user device.

20. The system as in claim 19 wherein the optical code comprises a quick response (QR) code or a barcode.

21. The system as in claim 18 wherein providing the encrypted challenge from the connected device to a user device comprises establishing a local wireless communication channel between the user device and the connected device.

22. The system as in claim 21 wherein the local wireless channel comprises a Bluetooth channel, a near field communication (NFC) channel, a WiFi channel, or a wireless USB channel.

23. A non-transitory machine-readable medium having program code stored thereon which, when executed by a machine, causes the machine to perform the operations of:
 generating a challenge at a server;
 encrypting the challenge at the server using a public encryption key;
 transmitting the encrypted challenge to a connected device having a first connection over a network with the server;
 providing the encrypted challenge from the connected device to a user device;
 decrypting the encrypted challenge at the user device using a private encryption key corresponding to the public encryption key to determine the challenge;
 converting the challenge to a converted challenge, the converted challenge having a different format than the original challenge;
 receiving the converted challenge at the connected device and providing the converted challenge from the connected device to the server, wherein receiving the converted challenge at the connected device comprises receiving manual user entry of the converted challenge via a user input device coupled to the connected device; and
 validating the converted challenge at the server to authenticate the user.

24. The machine-readable medium as in claim 23 wherein the challenge comprises a random challenge generated by a random number generator on the server.

25. The machine-readable medium as in claim 24 wherein converting the challenge comprises truncating a portion of the challenge and using the truncated portion or a remaining portion following truncation for the converted challenge.

\* \* \* \* \*